(12) United States Patent
Suzuki et al.

(10) Patent No.: US 8,683,110 B2
(45) Date of Patent: Mar. 25, 2014

(54) I/O SYSTEM AND I/O CONTROL METHOD

(75) Inventors: Jun Suzuki, Tokyo (JP); Youichi Hidaka, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/674,337

(22) PCT Filed: Aug. 25, 2008

(86) PCT No.: PCT/JP2008/065105
§ 371 (c)(1),
(2), (4) Date: Feb. 19, 2010

(87) PCT Pub. No.: WO2009/025381
PCT Pub. Date: Feb. 26, 2009

(65) Prior Publication Data
US 2011/0219164 A1     Sep. 8, 2011

(30) Foreign Application Priority Data

Aug. 23, 2007  (JP) ................................. 2007-217403

(51) Int. Cl.
*G06F 13/36* (2006.01)
(52) U.S. Cl.
USPC .............................................. 710/314; 710/3
(58) Field of Classification Search
None
See application file for complete search history.

(56) References Cited

U.S. PATENT DOCUMENTS

| 5,581,709 | A  | * | 12/1996 | Ito et al. ........................... 710/38 |
| 7,062,590 | B2 | * | 6/2006 | Solomon ....................... 710/306 |
| 7,752,360 | B2 | * | 7/2010 | Galles ............................. 710/62 |
| 7,890,669 | B2 | * | 2/2011 | Uehara et al. .................... 710/22 |
| 7,979,592 | B1 | * | 7/2011 | Pettey et al. ....................... 710/3 |
| 8,327,055 | B2 | * | 12/2012 | Armstrong et al. ........... 710/311 |
| 2008/0148032 | A1 | * | 6/2008 | Freimuth et al. .................. 713/1 |

FOREIGN PATENT DOCUMENTS

| JP | 08-006893 | A | 1/1996 |
| JP | 2001-282701 | A | 10/2001 |
| JP | 2001-337909 | A | 12/2001 |
| JP | 2004-355351 | A | 12/2004 |
| JP | 2005-122640 | A | 5/2005 |
| JP | 2005-317021 | A | 11/2005 |
| JP | 2006-085400 | A | 3/2006 |
| JP | 2007-148621 | A | 6/2007 |
| JP | 2008-0212525 | A | 1/2008 |

OTHER PUBLICATIONS

International Search Report for PCT/JP2008/065105, mailed Nov. 25, 2008.

(Continued)

*Primary Examiner* — Idriss N Alrobaye
*Assistant Examiner* — Dayton Lewis-Taylor
(74) *Attorney, Agent, or Firm* — Sughrue Mion, PLLC

(57) ABSTRACT

Virtual Functions (VFs) 602-1 to 602-N of an I/O device are separately allocated to a plurality of computers 1-1 to 1-N. In an address swap table 506, a root domain that is an address space of the computer 1 and mapping information of an I/O domain that is an address space unique to the I/O device 6 are registered. Mapping is set with the VFs 602-1 to 602-N as units. When accessing the VFs 602-1 to 602-N of the I/O device 6 to which each of the computers 1-1 to 1-N is allocated, an I/O packet transfer unit 701 checks the address swap table 506 to swap source/destination addresses recorded in packet headers.

18 Claims, 18 Drawing Sheets

(56) References Cited

OTHER PUBLICATIONS

PCI-SIG, "PCI Express Base Specification, Rev. 2.0", Dec. 20, 2006, p. 35.

Japanese Office Action, Record of prior art literature search result, for JP Application No. 2009-529085 mailed on Jul. 24, 2013, with English Partial Translation.

M. Krause et al., "Multi-Root Resource Discovery and Allocation", PCI-SIG Developers Conference Jun. 2006, the U.S.A., PCI-SIG, Jun. 2006, pp. 1-27, [internet] <http://www.pcisig.com/developers/main/training_materials/get_document?doc_id=e3da4046eb5314826343d9df18b60f083880bf7b> Concise English language explanation provided in partial translation of JPOA, on pp. 1.

M. Krause et al., "I/O Virtualization Architecture Overview", PCI-SIG Developers Conference May 2007, the U.S.A., PCI-SIG, May 2007, pp. 1-40, [internet] <http://www.pcisig.com/developers/main/training_materials/get_documents?doc_id=0ab681ba7001e40cdb297ddaf279a8de82a7dc40> Concise English language explanation provided in partial translation of JPOA, on pp. 1.

* cited by examiner

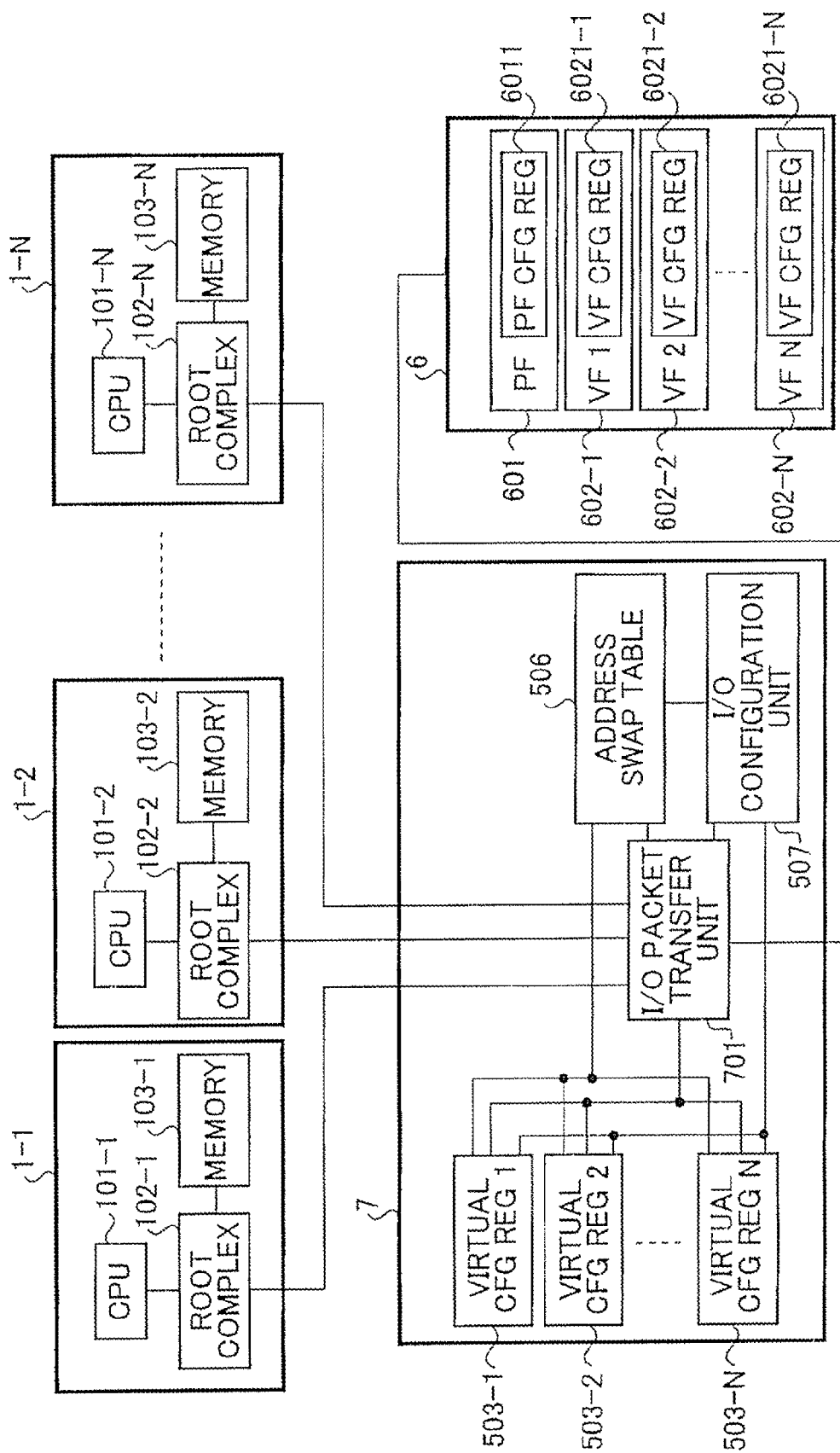

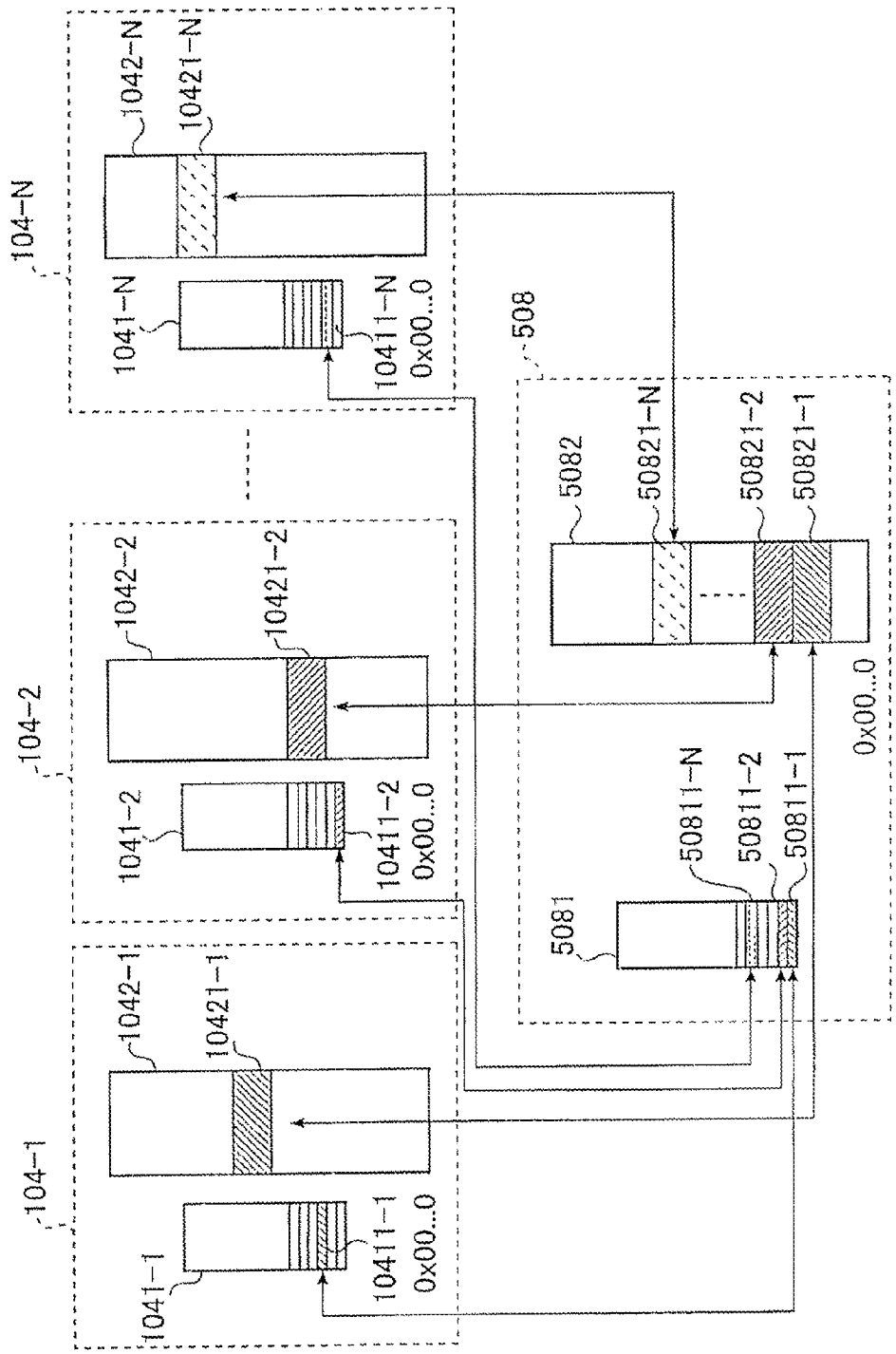

| FUNCTION NUMBER OF VF 602 | DESTINATION COMPUTER |
|---|---|
| $F_{VF1I}$ | COMPUTER 1-1 |
| $F_{VF2I}$ | COMPUTER 1-2 |
| ⋮ | ⋮ |
| $F_{VFNI}$ | COMPUTER 1-N |

5062-1, 5062-2, 5062-N

| | ROOT DOMAIN 104-1 | I/O DOMAIN 508 |
|---|---|---|
| ID NUMBER OF ROOT COMPLEX 102-1 | $B_{R1R}, D_{R1R}, F_{R1R}$ | $B_{R1I}, D_{R1I}, F_{R1I}$ |
| ID NUMBER OF VF 602-1 | $B_{VF1R}, D_{VF1R}, F_{VF1R}$ | $B_{VF1I}, D_{VF1I}, F_{VF1I}$ |
| LOWER LIMIT OF MEMORY SPACE OF VF 602-1 | MEM LOWER LIMIT $_{VF1R}$ | MEM LOWER LIMIT $_{VF1I}$ |
| UPPER LIMIT OF MEMORY SPACE OF VF 602-1 | MEM UPPER LIMIT $_{VF1R}$ | MEM UPPER LIMIT $_{VF1I}$ |

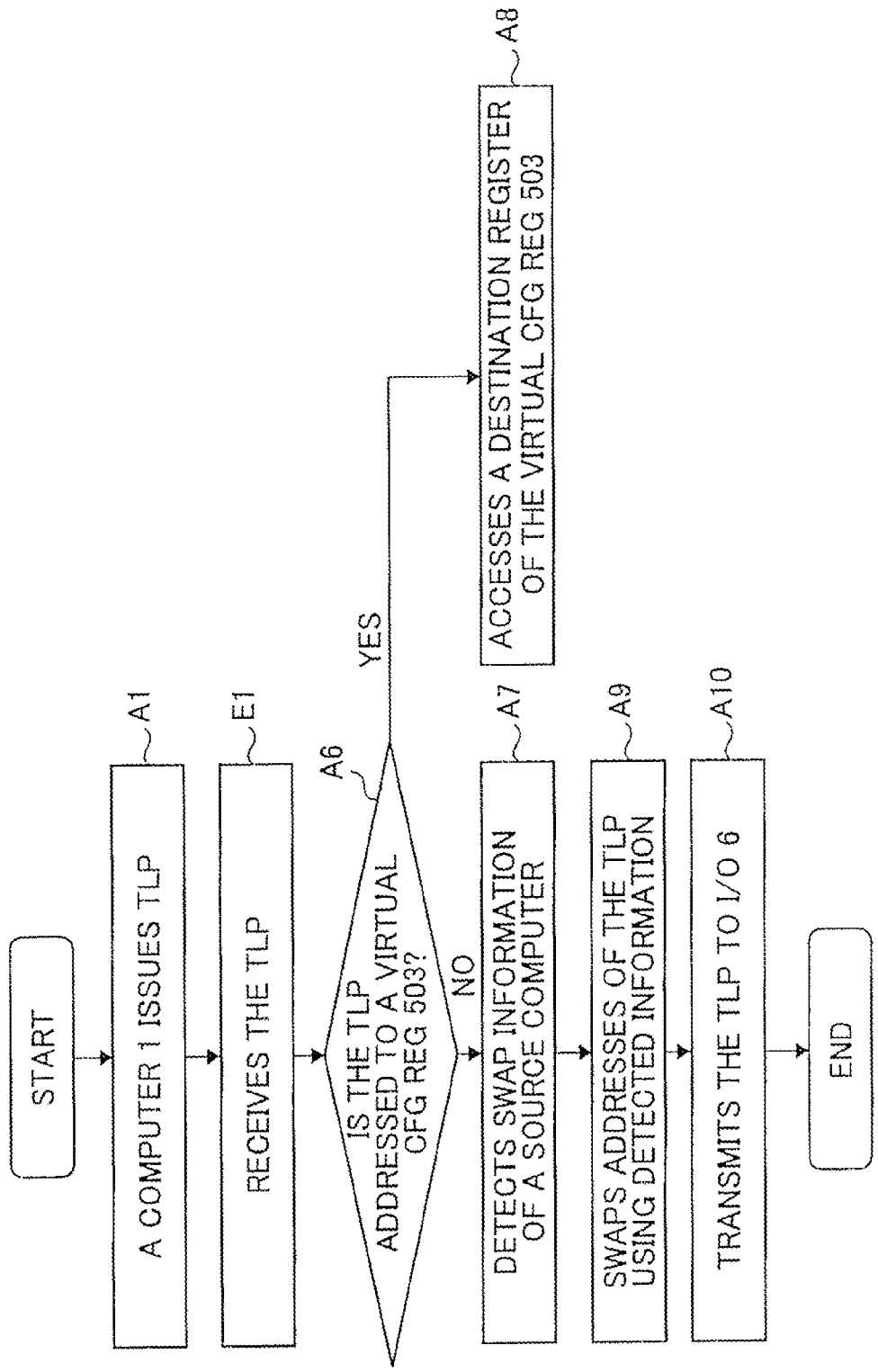

I/O SYSTEM AND I/O CONTROL METHOD

The present application is the National Phase of PCT/JP2008/065105, filed on Aug. 25, 2008, which claims priority from Japanese Patent Application No. 2007-217403 filed on Aug. 23, 2007, the contents of which being incorporated herein by reference.

TECHNICAL FIELD

The present invention relates to an I/O system and an I/O control method and particularly, to an I/O system and an I/O control method that can share an I/O device between a plurality of computers.

BACKGROUND ART

As disclosed in NPL 1 for example, such type of I/O system connects an I/O device (Input and Output device) in a single computer, and the computer is used for use of the I/O device. As shown in FIG. 1, the I/O system, for example, uses PCI Express (Registered Trademark; PCI Express is referred to as PCIe, hereinafter) and includes a root complex 102 that bridges a PCIe bus 13-0 and a memory bus 12 to CPU 101; a PCIe switch 10 that performs fan-out of the PCIe bus 13-0; and I/O devices 11-1 to 11-N (N is a natural number greater than or equal to two) that are connected to the PCIe switch 10 through PCI buses 13-1 to 13-N. In the PCIe, the side of the root complex 102 is referred to as the upstream and the side of the I/O devices 11-1 is referred to 11-N as the downstream.

The PCIe switch 10 includes an upstream PCI-PCI bridge 801 and downstream PCI-PCI bridges 902-1 to 902-N.

The upstream PCI-PCI bridges 801 is equipped with a configuration register (CFG REG) 8011 and the downstream PCI-PCI bridges 902-1 to 902-N are equipped with configuration registers (CFG REG) 9021-1 to 9021-N. The CFG REG 8011 and the CFG REGs 9021-1 to 9021-N each retain information about address spaces allocated to the devices that are connected to the more downstream sides than the bridges 801 and 902-1 to 902-N. The PCIe uses an ID number that is a combination of a bus number, a device number and a function number, and a memory space, as an address. Therefore, more specifically, the CFG REG 8011 and the CFG REGs 9021-1 to 9021-N each retain the lower and upper limits of a bus number allocated to the more downstream side than the bridges 801 and 902-1 to 902-N and the lower and upper limits of a memory space allocated to the more downstream side than the bridges 801 and 902-1 to 902-N.

As shown in FIG. 2, the I/O devices 11-1 to 11-N are mapped onto a physical memory space 14 of a computer to which the I/O devices 11-1 to 11-N are connected. In FIG. 2, the I/O devices 11-1 to 11-N are mapped between a map 1401-1 of the I/O device 11-1 and a map 1401-N of the I/O device 11-N on the physical memory space 14.

The I/O system having such configuration operates in the following manner.

When software that runs on the CPU 101 accesses, for example, the I/O device 11-1 of the I/O devices 11-1 to 11-N, the CPU 101 issues a command to the root complex 102. Following the protocol standardized in PCIe, the root complex 102 generates and issues TLP (Transaction Layer Packet). In the destination of the TLP header, the ID number allocated to the I/O device 11-1 to be accessed or the memory space on which the I/O device 11-1 is mapped is recorded. The PCIe switch 10 receives the TLP, and compares the address recorded in the header with information held by CFG REG 8011. If the destination of the TLP is connected to the downstream side of the upstream PCI-PCI bridge 801, the PCIe switch 10 then compares the address with information held by CFG REG 9021-2 and transmits the TLP to the I/O device 11-1 which is the destination of the TLP.

On the other hand, if the I/O device 11-1t of the I/O devices 11-1 to 11-N issues TLP to the CPU 101, the opposite procedure to the above procedure is performed. In this case, the PCIe switch 10 that receives the TLP from the I/O device 11-1 checks CFG REG 9021-1 and determines that the destination of the TLP does not correspond to the device connected to the downstream side of the downstream PCI-PCI bridge 902-1 that receives the TLP. Subsequently, the PCIe switch 10 compares the address with information held by CFG REG 8011 and determines that the destination of the TLP does not correspond to the device connected to the downstream side of the upstream PCI-PCI bridge 801. Then, the PCIe switch 10 transfers the TLP to the root complex 102. Therefore, the TLP is transmitted to the CPU 101.

According to DMA (Direct Memory Access), for example, the I/O device 11-1 of the I/O devices 11-1 to 11-N directly writes or reads data to or from a memory 103 of the computer. In this case, for example, the I/O device 11-1 regards the address of the memory onto which the memory 103 is mapped, as destination, generates TLP and then accesses the memory 103. At this time, the TLP transfer procedure of the I/O system is the same as the procedure of the I/O device 11-1 accessing the CPU 101.

CITATION LIST

Patent Literature

[NPL 1] PCI-SIG, "PCI Express Base Specification Revision 2.0," Dec. 20, 2006, pp. 35

SUMMARY OF INVENTION

Technical Problem

The first problem is that the I/O device cannot be shared between a plurality of computers. The reason is that the conventional I/O system is designed on the assumption that the I/O device is used only within the address space of a single computer.

The second problem is that in order to share the I/O device between a plurality of computers, the operating system and device drivers need to be changed. The reason is that like the first problem, the conventional I/O system is designed on the assumption that the I/O device is used only within the address space of a single computer.

Object of Invention

The first exemplary object of the present invention is to provide the I/O system that can share the I/O device between a plurality of computers.

The second exemplary object of the present invention is to provide the I/O system that can share the I/O device between a plurality of computers without changing the conventional operating system and device drivers.

Solution to Problem

A first exemplary I/O system of the present invention includes: a plurality of computers; an I/O device; and an I/O virtualization device provided between the plurality of computers and the I/O device, wherein the I/O virtualization device forms an address space unique to the I/O device and maps the address space of the I/O device onto address spaces of the plurality of computers.

Moreover, a second exemplary I/O system of the present invention includes: a plurality of computers; an I/O device that holds memory spaces and interrupt resources to be separately allocated to the plurality of computers; and an I/O virtualization device that forms an address space unique to the I/O device, and swaps address spaces of the computers and the address space of the I/O device, for packets (I/O packets) used for access between the computers and the I/O device.

Moreover, a third exemplary I/O system of the present invention includes: a plurality of computers; a network that transfers encapsulated packets (I/O packets) which are used for accessing the I/O device; an I/O device that holds memory spaces and interrupt resources which are separately allocated to the plurality of computers; computer bridges that offer bridges between the computers and the network and allow the computers to encapsulate and decapsulate the I/O packets; an I/O virtualization bridge that offers a bridge between the network and the I/O device, encapsulates and decapsulates the I/O packets, and swaps an address space of the computer and an address space created unique to the I/O device for address information of the I/O packets; and a manager that controls connection between the computer bridge and the I/O virtualization bridge.

A first exemplary I/O control method of the present invention includes: forming an address space unique to the I/O device; and mapping the address space of the I/O device onto address spaces of a plurality of the computers to share the I/O device between the plurality of computers.

Moreover, according to the present invention, a second exemplary I/O control method of an I/O system that includes a plurality of computers and an I/O device provided for the plurality of computers includes: swapping address spaces of the computers and an address space of the I/O device for packets (I/O packets) used for access between the computers and the I/O device; and allocating separately memory spaces of the I/O device and interrupt resources to the plurality of computers.

Moreover, a third exemplary I/O control method of the present invention includes: tunneling between a plurality of computers and an I/O device which are connected through a network, by encapsulating and decapsulating packets (I/O packets) that the computers use to access the I/O device; changing, through setting, a combination of the plurality of computers and the I/O device that are connected by tunneling; swapping address spaces of the computers and an address space of the I/O device on address information of the I/O packets; and allocating separately memory spaces and interrupt resources of the I/O device to the plurality of computers.

Advantageous Effects of Invention

The first effect of the present invention is that the I/O device can be shared between a plurality of computers.

The second effect of the present invention is that the I/O device can be shared between a plurality of computers without changing the conventional operating system and device drivers.

BRIEF DESCRIPTION OF DRAWINGS

FIG. 3 A block diagram illustrating the configuration of a first exemplary embodiment of the present invention.
FIG. 4 A diagram for explaining the first exemplary embodiment of the present invention.
FIG. 5 A diagram for explaining the first exemplary embodiment of the present invention.
FIG. 6 A flowchart illustrating the operation of the first exemplary embodiment of the present invention.

REFERENCE SIGNS LIST

Figure 1:
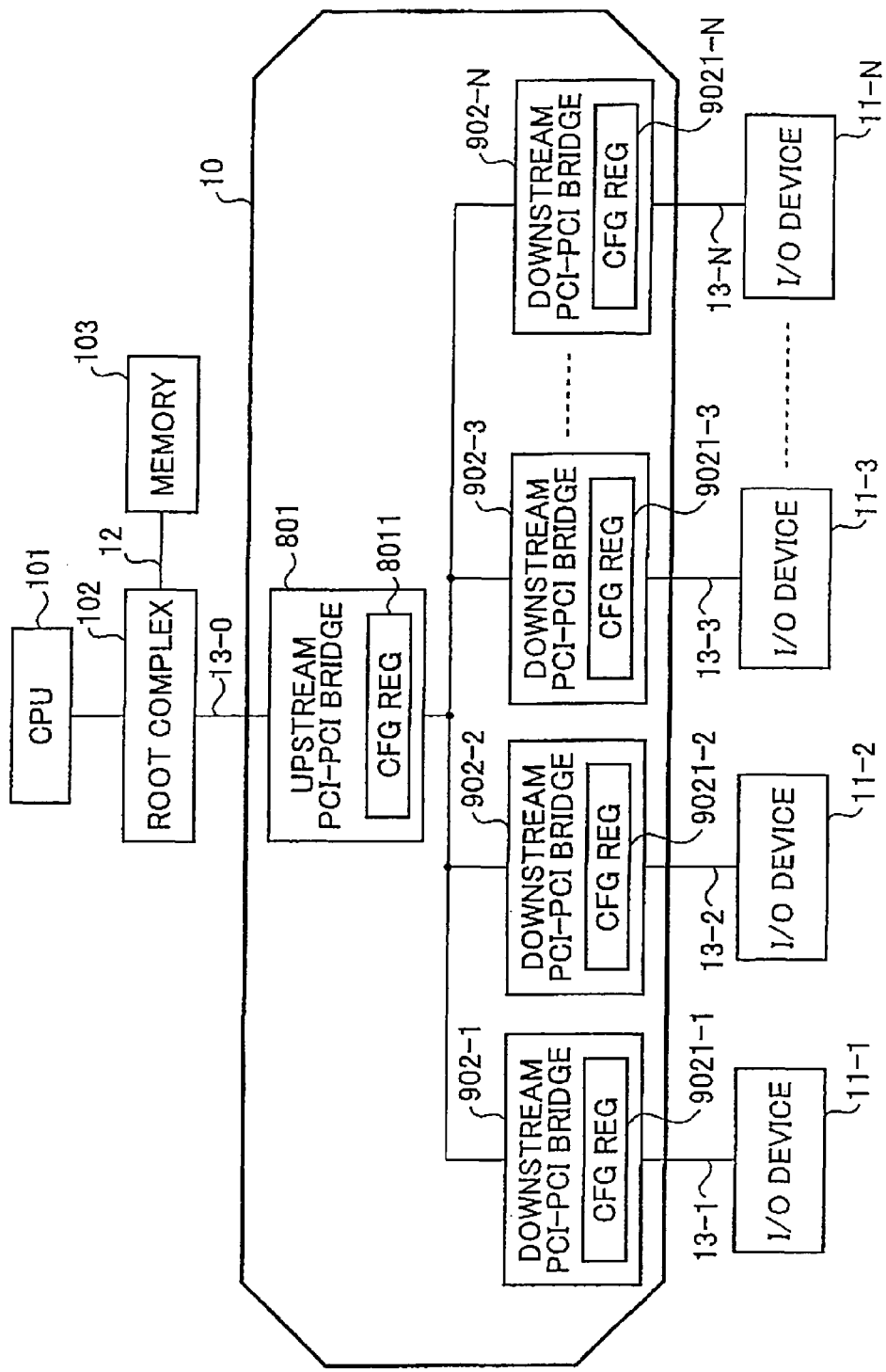
FIG. 1 A block diagram illustrating the configuration of the related art.
Figure 2:
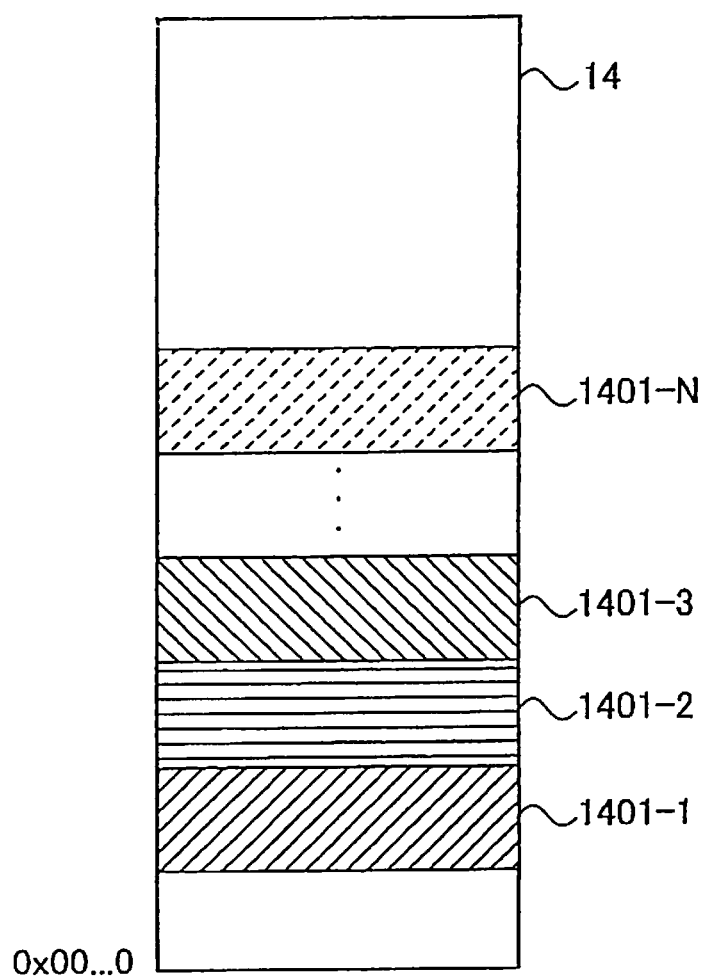
FIG. 2 A diagram for explaining the related art.

1: Computer
2: Computer bridge
3: Network
4: System manager
5: I/O virtualization bridge
6: SR-IVO-compliant I/O device
7: I/O virtualization module
8: Computer bridge
9: I/O virtualization bridge
10: PCIe switch
11: I/O device
101: CPU
102: Root complex
103: Memory
201: Network transfer unit
202: Connection management unit
203: Encapsulation table
501: Network transfer unit
502: I/O packet transfer unit
503: Virtual configuration register (CFG REG)
504: Connection management unit
505: Encapsulation table
506: Address swap table
507: I/O configuration unit
601: Physical Function (PF)
602: Virtual Function (VF)

701: Packet transfer unit
801: Upstream PCI-PCI bridge
901: Network transfer unit
902: Downstream PCI-PCI bridge
903: I/O packet transfer unit

DESCRIPTION OF EMBODIMENTS

The following describes in detail exemplary embodiments of the present invention with reference to the accompanying drawings.

First Exemplary Embodiment

FIG. 3 is a block diagram illustrating the configuration of a first exemplary embodiment of the present invention.

FIG. 3 shows the case in which an I/O device that complies with PCI Express (Registered Trademark; PCI Express is referred to as PCIe, hereinafter) is used as an I/O device that is shared in an I/O system of the present exemplary embodiment. The I/O system of the present exemplary embodiment includes a plurality of computers 1-1 to 1-N (N is a natural number greater than or equal to two); an I/O device 6 that is simultaneously shared between the computers 1-1 to 1-N, the I/O device 6 being compatible with Single Root I/O Virtualization (SR-IOV); and an I/O virtualization module 7, which is connected to the computers 1-1 to 1-N through PCIe buses. The I/O virtualization module 7 generates an address space unique to the I/O device 6 to share the I/O device 6 between the computers 1-1 to 1-N. The I/O virtualization module 7 becomes an I/O virtualization device.

The computers 1-1 to 1-N are equipped with CPUs 101-1 to 101-N, root complexes 102-1 to 102-N, and memories 103-1 to 103-N. For example, the computer 1-1 is equipped with the CPU 101-1, the root complex 102-1, and the memory 103-1. The computers 1-1 to 1-N are connected to the I/O virtualization module 7 through a PCIe bus.

The I/O device 6 is SR-IOV-compatible I/O device. Such an I/O device is so designed as to mitigate overhead related to sharing when the I/O device is shared between a plurality of virtual machines in a single computer. The I/O device 6 includes Physical Function (PF) 601, which accepts the overall setting of the I/O device 6; and Virtual Functions (referred to as VF, hereinafter) 602-1 to 602-N, which represent resources that are separately allocated to the virtual machines. The PF 601 and the VFs 602-1 to 602-N can be differentiated by function numbers that constitute the ID numbers. The PF 601 includes PF CFG REG 6011 which is a configuration register (CFG REG) that complies with PCIe, and the VFs 602-1 to 602-N include VF CFG REGs 6021-1 to 6021-N which are configuration registers (CFG REGs) that comply with PCIe. When the virtual machines share the I/O device 6 in a single computer, the VFs 602-1 to 602-N are allocated to respective virtual machines. Therefore, the VFs 602-1 to 602-N are directly mapped on the memories of the virtual machines, and interrupts from the I/O device 6 are carried out for each virtual machine with the ID numbers of the VFs 602-1 to 602-N as identifiers. In the present exemplary embodiment, as shown in FIG. 3, VFs 602-1 to 602-N are separately allocated to a plurality of the computers 1-1 to 1-N to allow the computers 1-1 to 1-N to operate the VFs 602-1 to 602-N at the same level as the functions that a conventional I/O device is equipped with. Therefore, the I/O device 6 is shared between a plurality of the computers 1-1 to 1-N.

The I/O virtualization module 7 forms a single address space unique to the I/O device 6 in order to share the I/O device 6 between a plurality of the computers 1-1 to 1-N and regards the VFs 602-1 to 602-N that the I/O device 6 has, as units, to map the address space onto the address space of each of the computers 1-1 to 1-N. Which VFs 602-1 to 602-N are mapped onto which computers 1-1 to 1-N is determined by how the computers 1-1 to 1-N are connected to the virtual module 7 with wire. Hereinafter, the unique address space created for the I/O device 6 is called I/O domain and the respective address spaces of the computers 1-1 to 1-N are called root domain. The unique address space created for the I/O device 6 and the respective address spaces of the computers 1-1 to 1-N are distinguished with the appellations "I/O domain" and "called root domain".

The I/O virtualization module 7 includes an I/O packet transfer unit 701, which swaps destination/source addresses that the header of Transaction Layer Packet (TLP) (which is to become an I/O packet) has and transfers the addresses; an address swap table 506, which holds the mapping information related to ID numbers of the root domain and I/O domain, and a memory space; an I/O configuration unit 507, which configures the I/O device 6 in advance before the configuration cycle of the computers 1-1 to 1-N starts; and virtual CFG REGs 503-1 to 503-N, which use a register that complies with the standard to acquire the address space that is required to map the VFs 602-1 to 602-N on the root domain during the configuration cycle of the computers 1-1 to 1-N. The I/O packet transfer unit 701 configures a swap unit, the address swap table 506 configures a holding unit that holds swap information, the I/O configuration unit 507 configures an address space formation unit, and the virtual CFG REGs 503-1 to 503-N configures an acquisition unit.

As shown in FIG. 4, the computers 1-1 to 1-N each retain root domains 104-1 to 104-N. The root domains 104-1 to 104-N include ID number spaces 1041-1 to 1041-N, which hold resources of ID numbers that are combinations of bus numbers, device numbers, and function numbers; and physical memory spaces 1042-1 to 1042-N.

Moreover, as shown in FIG. 4, the I/O virtualization module 7 creates an I/O domain 508 that is an address space unique to the I/O device 6, allocates to the I/O device 6 a single ID number space 5081 and a physical memory space 5082 that constitute the I/O domain 508, and maps the allocated ID numbers and memory spaces on the root domains 104-1 to 104-N with the VFs 602-1 to 602-N as units. In FIG. 4, as for the computer 1-1, a map 50811-1 of the computer 1-1 is mapped on a map 10411-1 of the I/O device 6 in the ID number space 5081; a map 50821-1 of the computer 1-1 is mapped on a map 10421-1 of the I/O device 6 in the physical memory space 5082. As for the computer 1-2, a map 50811-2 of the computer 1-2 is mapped on a map 10411-2 of the I/O device 6 in the ID number space 5081; a map 50821-2 of the computer 1-2 is mapped on a map 10421-2 of the I/O device 6 in the physical memory space 5082. As for the computer 1-N, a map 50811-N of the computer 1-N is mapped on a map 10411-N of the I/O device 6 in the ID number space 5081; a map 50821-N of the computer 1-N is mapped on a map 10421-N of the I/O device 6 in the physical memory space 5082.

The I/O packet transfer unit 701 receives the TLPs that are issued by the computers 1-1 to 1-N corresponding to the allocated VFs 602-1 to 602-N and addressed to the I/O device 6, and transfers the TLPs to the virtual CFG REGs 503-1 to 503-N corresponding to the computers 1-1 to 1-N that are the sources of TLPs or to the I/O device 6. For example, the I/O packet transfer unit 701 receives the TLP that is issued by the computers 1-1 corresponding to the allocated VF 602-1 and addressed to the I/O device 6, and transfers the TLP to the virtual CFG REG 503-1 corresponding to the computer 1-1 that is the source of TLP or to the I/O device 6.

The TLPs that are transferred to the virtual CFG REGs 503-1 to 503-N are part of the TLPs related to configuration access, and all the remaining TLPs are transferred to the I/O device 6. When the TLPs are transferred to the I/O device 6, the swap information of the ID numbers and memory addresses corresponding to the computers 1-1 to 1-N that are the sources of TLPs is detected from the address swap table 506. The TLPs are then transferred to the I/O device 6 by swapping the destination/source addresses that the headers of the TLPs have with the use of the obtained information. On the other hand, when the TLPs are transferred to the virtual CFG REGs 503-1 to 503-N, the addresses are not swapped.

Moreover, the I/O packet transfer unit 701 receives from the I/O device 6 the TLPs addressed to the computers 1-1 to 1-N; uses the address swap table 506 to detect, from the function numbers of the VFs 602-1 to 602-N of the I/O device 6 that has issued the TLPs, one of the destination computers 1-1 to 1-N to which the VFs 602-1 to 602-N are allocated; detects the swap information of the ID number corresponding to one of the destination computers 1-1 to 1-N; and transmits the TLPs to one of the destination computers 1-1 to 1-N by swapping the destination/source addresses that the headers of the TLPs have with the use of the obtained information. For example, when the destination computer is the computer 1-1, the TLPs are transmitted to the computer 1-1. At this time, if the destination header of the TLP that the I/O device issues retains a memory address, swapping is not performed. The reason is that the information that the computers 1-1 to 1-N transfer to the Direct Memory Access (DMA) controller (not shown) of the I/O device 6 directly designates the values of memory addresses of the computers 1-1 to 1-N. Furthermore, the I/O packet transfer unit 701 receives from the virtual CFG REGs 503-1 to 503-N the response TLPs of configuration access for the virtual CFG REGs 503-1 to 503-N of the computers 1-1 to 1-N and transmits the response TLPs to the computers 1-1 to 1-N.

The address swap table 506 includes, as shown in FIG. 5, one target computer retrieval table 5061, and root domain mapping tables 5062-1 to 5062-N, the number of which is the same as that of the computers 1-1 to 1-N. The address swap table 506 provides the mapping information of the root domains 104-1 to 104-N and I/O domains 508 to the I/O packet transfer unit 701. Incidentally, FIG. 5 shows the contents of only the root domain mapping table 5062-1.

The target computer retrieval table 5061 is a table to identify the destination computers 1-1 to 1-N from the function numbers ($F_{VFnI}$: n is an identifier to distinguish the VFs 602-1 to 602-N and satisfies the relation 1≤n≤N) in the I/O domain 508 of the VFs 602-1 to 602-N that have issued the TLPs to the computers 1-1 to 1-N. The root domain mapping tables 5062-1 to 5062-N are prepared for the respective computers 1-1 to 1-N, and provide the ID numbers and the mapping information of memory address. In FIG. 5, the ID numbers (bus numbers, device numbers, and function numbers) of the root complexes 102-1 to 102-N of the root domains 104-1 to 104-N and the ID numbers of the VFs 602-1 to 602-N of the I/O device 6 are respectively ($B_{RnR}$, $D_{RnR}$, $F_{RnR}$) and ($B_{VFnR}$, $D_{VFnR}$, $F_{VFnR}$), which are respectively mapped onto ($B_{RnI}$, $D_{RnI}$, $F_{RnI}$) and ($B_{VFnI}$, $D_{VFnI}$, $F_{VFnI}$) of the I/O domain 508. On the other hand, the lower and upper limits of the map 10421 of the I/O device 6 that is mapped on the memory of the root domain 104 are respectively a Mem lower limit $_{VFnR}$ and a Mem upper limit $_{VFnR}$, which are respectively mapped onto a Mem lower limit $_{VFnI}$ and Mem upper limit $_{VFnI}$ of the I/O domain 508.

The I/O configuration unit 507 simulates the configuration access of the computers 1-1 to 1-N before the configuration cycle of the computers 1-1 to 1-N starts, to configurate the I/O device 6. The I/O configuration unit 507 reads from the PF CFG REG 6011 the memory space that each of the VFs 602-1 to 602-N requests and id reflected the memory space in the virtual CFG REGs 503-1 to 503-N. Moreover, the I/O configuration unit 507 sets the ID numbers and physical memory space of the I/O domain 508 to be allocated to the VFs 602-1 to 602-N, to PF CFG REG 6011, and registers the set information in the address swap table 506. Moreover, the I/O configuration unit 507 writes the setting information in the PF CFG REG 6011 and the VF CFG REGs 6021-1 to 6021-N.

The virtual CFG REGs 503-1 to 503-N acquires, during the configuration cycle of the computers 1-1 to 1-N, the address spaces necessary for mapping the VFs 602-1 to 602-N on the root domains by using the register that complies with the standard. In FIG. 3, the virtual CFG REG 1 503-1 to virtual CFG REG N 503-N correspond to the VF 1 602-1 to VF N 602-N, and acquire the address spaces necessary for mapping from the computers to which the VFs 602-1 to 602-N are allocated. More specifically, the virtual CFG REGs 503-1 to 503-N receive from the corresponding computers 1-1 to 1-N the configuration TLPs that inquire the memory spaces that the VFs 602-1 to 602-N request; provide information about the memory spaces; receive the configuration TLPs that inform the ID numbers and memory spaces that the computers 1-1 to 1-N allocate to the VFs 602-1 to 602-N; and holds the information. Moreover, the virtual CFG REGs 503-1 to 503-N record the ID number of the root complex 102 that is the source of the TLPs. The ID numbers and memory spaces held by the virtual CFG REGs 503-1 to 503-N represent the root complex 102 of the root domains 104-1 to 104-N, the ID numbers of the VFs 602-1 to 602-N, and the memory spaces allocated to the VFs 602-1 to 602-N, and the numbers are registered in the address swap table 506.

As described above, the I/O system of the present exemplary embodiment includes the I/O configuration unit (507 in FIG. 3), which allocates the ID numbers and memory spaces of the I/O domain to the I/O device; the virtual configuration registers (503-1 to 503-N in FIG. 3), which request from the computers the address spaces that the Virtual Functions (VFs) which the I/O device is equipped with need, by using the configuration register that complies with the standard of PCIe; the address swap table (506 in FIG. 3), which retains information to map the ID numbers and memory spaces of the I/O domain onto the ID numbers and memory spaces of the root domains of a plurality of computers, with the VFs as units; and the I/O packet transfer unit (701 in FIG. 3), which swaps the addresses that the header of Transaction Layer Packet (TLP) has between the root domain and the I/O domain. Such configuration is applied; the I/O domain that is an address space unique to the I/O device is defined; the address space necessary for mapping the VFs of the I/O device is acquired from the root domain that is an address space of the computer, with the use of the register that complies with the standard; the ID numbers and memory spaces of the I/O domain are mapped onto the ID numbers and memory spaces of a plurality of root domains, with the VFs as units; and the VFs that the single I/O device is equipped with are separately allocated to a plurality of computers. Therefore, the I/O device can be shared between a plurality of computers.

The following describes the operation of the first exemplary embodiment of the present invention.

With reference to FIGS. 3, 5, and 6, the operation of the computers 1-1 to 1-N issuing the TLPs to the VFs 602-1 to 602-N of the allocated I/O device 6 will be described.

Described here is an example of the operation in which the computer 1-1 issues the TLP to the VF 602-1 of the I/O device 6. A similar operation is performed when the computers 1-2 to 1-N issue the TLPs to the VFs 602-2 to 602-N of the I/O device 6.

The computer 1-1 issues the TLP (Step A1). The I/O packet transfer unit 701 receives the issued TLP (Step E1) and makes a determination as to whether the TLP is addressed to the virtual CFG REG 503-1 (Step A6). If the TLP is addressed to the virtual CFG REG 503-1, the I/O packet transfer unit 701 transfers, without swapping the addresses of the TLP header, the TLP to the virtual CFG REG 503-1 corresponding to the computer 1-1 that has issued the TLP (Step A8). The determination of Step A6 is made by the type or offset of the PCI-compliant configuration register to be accessed in the configuration TLP. The TLP that is not in line with the determination of Step A6 detects the swap information of address from the root domain mapping table 5062-1 corresponding to the computer 1-1 that has received the TLP (Step A7). If the TLP is ID routing, the ID number ($B_{VF1I}$, $D_{VF1I}$, $F_{VF1L}$) of the VF 602-1 in the I/O domain 508 and the ID number ($B_{R1I}$, $D_{R1I}$, $F_{R1I}$ of the root complex 102-1 are detected to swap the destination and source information of the TLP. If the TLP is address routing, the Mem lower limit $_{VF1R}$ and the Mem lower limit $_{VF1I}$, which are the lower limits of the memory space of the VF 602-1 in the root domain 104-1 and the I/O domain 508, are detected to swap the destination memory address of the TLP. From the numbers, the memory address for which the destination memory address of the TLP is swapped is calculated as (the destination memory address in the root domain 104-1)−Mem lower limit $_{VF1R}$+Mem lower limit $_{VF1I}$. Moreover, the ID number of the root complex 102 of the I/O domain 508 is also detected to swap the source address. The I/O packet transfer unit 701 swaps the addresses of the TLP header using the obtained information (Step A9), and transmits the TLP to the I/O device 6 (Step A10).

Figure 7:
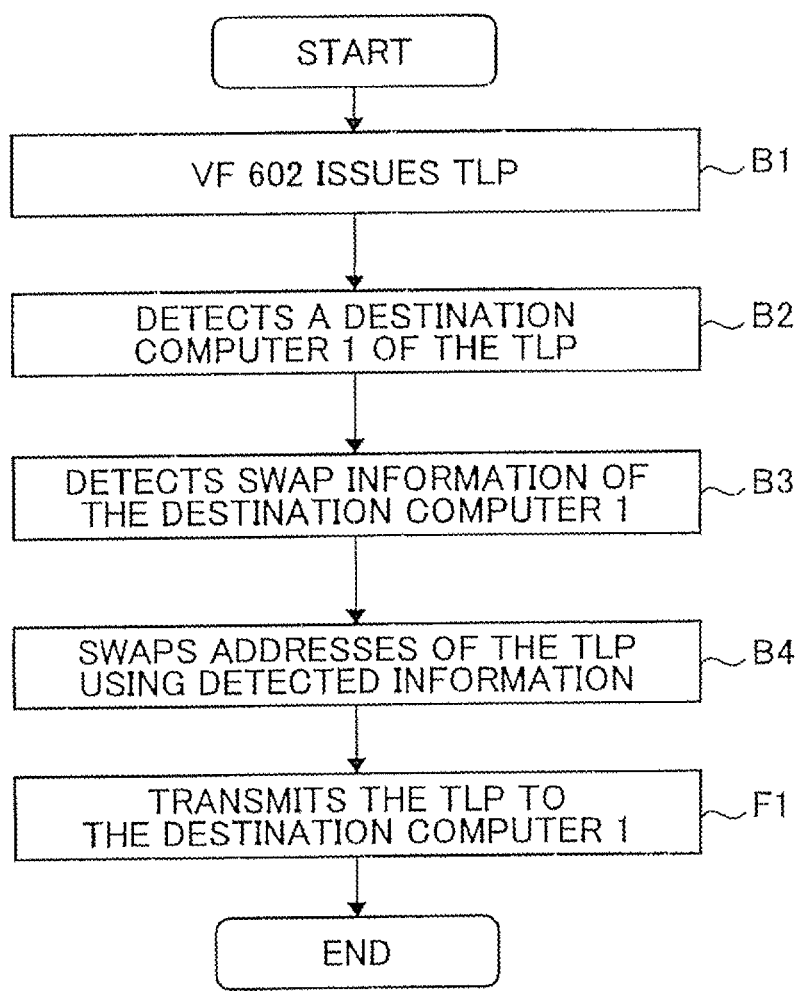
FIG. 7 A flowchart illustrating the operation of the first exemplary embodiment of the present invention.

With reference to FIGS. 3, 5, and 7, the following describes the operation of the VFs 602-1 to 602-N issuing the TLPs to the corresponding computers 1-1 to 1-N; the VFs 602-1 to 602-N that the I/O device 6 is equipped with are allocated to the computers 1-1 to 1-N. Described here is an example of the operation in which the VF 602-1 issues the TLP to the corresponding computer 1-1; the VF 602-1 that the I/O device 6 is equipped with is allocated to the computers 1-1. A similar operation is conducted when the VFs 602-2 to 602-N issue the TLPs to the corresponding computers 1-2 to 1-N; the VFs 602-2 to 602-N that the I/O device 6 is equipped with are allocated to the computers 1-2 to 1-N.

The VF 602-1 issues the TLP to the computer 1-1 (Step B1). The I/O packet transfer unit 701 acquires the function number of the VF 602-1 that has issued the TLP: the function number is held by the source ID number of the received TLP. Using the function number, the I/O packet transfer unit 701 detects the destination computer 1-1 from the target computer retrieval table 5061 (Step B2). Subsequently, the I/O packet transfer unit 701 detects the swap information of address using the root domain mapping table 5062-1 corresponding to the destination computer 1-1 (Step B3). If the TLP is ID routing, the ID number ($B_{R1R}$, $D_{R1R}$, $F_{R1R}$) of the root complex 102-1 in the root domain 104-1 and the ID number ($B_{VF1R}$, $D_{VF1R}$, $F_{VF1R}$) of the VF 602-1 are detected to swap the destination and source information of the TLP. If the TLP is address routing, only the ID number ($B_{VF1R}$, $D_{VF1R}$, $F_{VF1R}$) of the VF 602-1 in the root domain 104-1 is detected. The I/O packet transfer unit 701 then uses the obtained information to swap the TLP (Step B4). If the TLP is ID routing, both the destination and source addresses are swapped. If the TLP is address routing, only the source address (the address of the VF 602-1) is swapped. The I/O packet transfer unit 701 transmits to the computer 1-1 the TLP whose address is swapped (Step F1).

The following describes the operation of configuration (setting) of the I/O device 6 in order to share the I/O device 6 between a plurality of the computers 1-1 to 1-N. The configuration of the I/O device 6 is conducted in two stages: the configuration of the I/O device 6 by the I/O virtualization module 7 before the configuration cycle of the computers 1-1 to 1-N for the allocated VFs 602-1 to 602-N starts, and the configuration of the allocated VFs 602-1 to 602-N by the computers 1-1 to 1-N. The configuration to the I/O device 6 by the I/O virtualization module 7 is an operation of checking the address space necessary for the resources that the shared I/O device allocates to each computer by simulating the configuration access of the computer and of allocating the address space unique to the I/O device to the I/O device on the basis of the checked address space.

Figure 8:
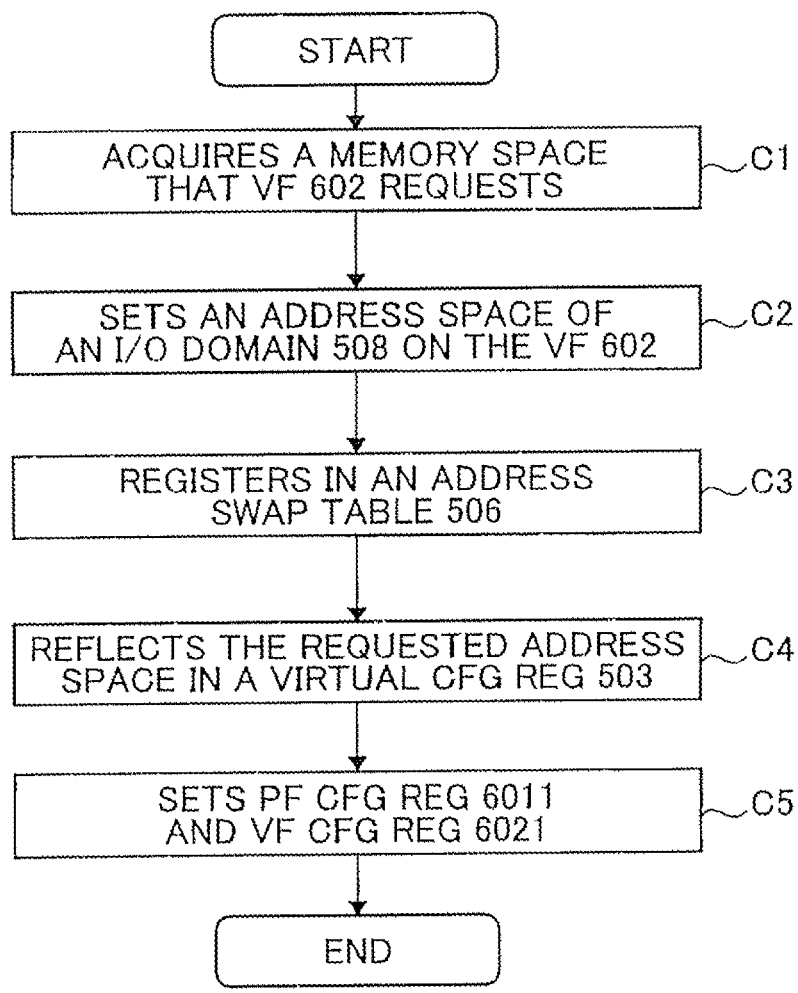
FIG. 8 A flowchart illustrating the operation of the first exemplary embodiment of the present invention.

The following describes the configuration of the I/O device 6 by the I/O virtualization module 7 that simulates the configuration access of the computers 1-1 to 1-N, with reference to FIGS. 3 and 8. The I/O configuration unit 507 acquires from the PF CFG REG 6011 the information about the memory spaces that each of the VFs 602-1 to 602-N requests (Step C1). Subsequently, the I/O configuration unit 507 sets the ID number and memory space of the I/O domain 508 in the PF CFG REG 6011 on the basis of the obtained information and then allocates the ID number and the memory space to the VFs 602-1 to 602-N (Step C2). Moreover, the I/O configuration unit 507 registers in the address swap table 506 the information set in the PF CFG REG 6011 (Step C3) and is reflected the address spaces that the VFs 602-1 to 602-N request, in the virtual CFG REGs 503-1 to 503-N corresponding to the VFs 602-1 to 602-N (Step C4). In addition, the I/O configuration unit 507 performs the required setting of the PF CFG REG 6011 and VF CFG REGs 6021-1 to 6021-N (Step C5). The setting relates to device control of the I/O device 6, link control, power-saving mode control, VF control, and the like. It is not necessary to carry out the step C5 at the above place in that order; the step C5 may be performed before the step C1 or between the steps C1 to C4.

Figure 9:
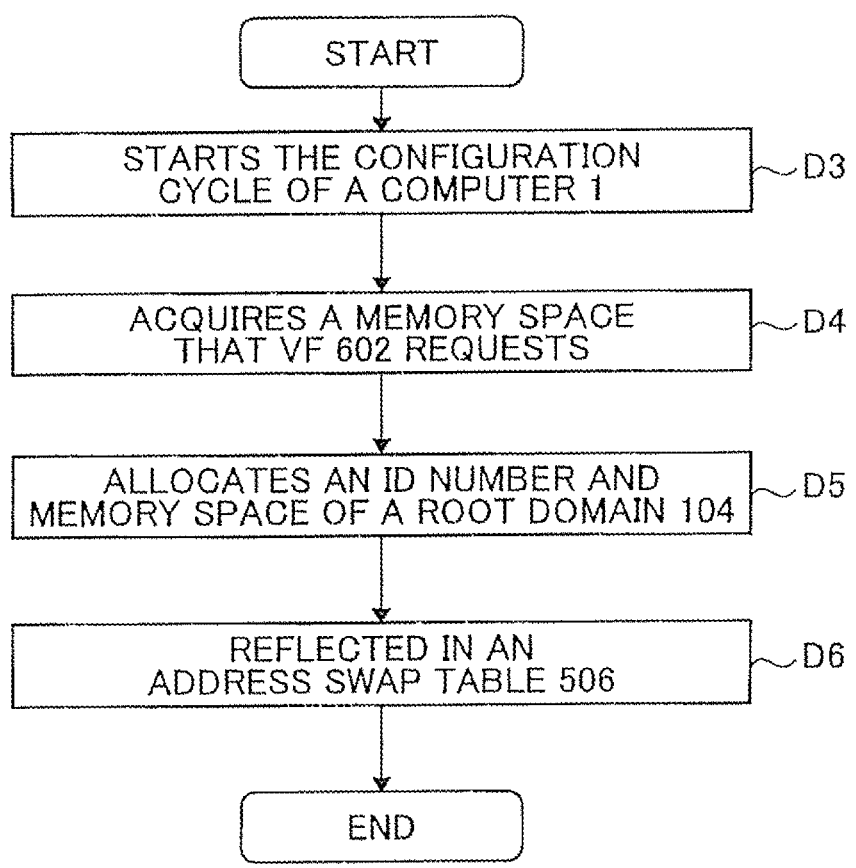
FIG. 9 A flowchart illustrating the operation of the first exemplary embodiment of the present invention.

The following describes the operation of the case in which the configuration by the computers 1-1 to 1-N starts for the VFs 602-1 to 602-N allocated to the computers 1-1 to 1-N after the configuration of the I/O device 6 by the I/O virtualization module 7, with reference to FIGS. 3 and 9.

In response to the booting of the system or to the notification of hot-plug events to which the VFs 602-1 to 602-N are allocated, the computers 1-1 to 1-N start the configuration of the VFs 602-1 to 602-N (Step D3). The computers 1-1 to 1-N acquire, from the virtual CFG REGs 503-1 to 503-N corresponding to the VFs 602-1 to 602-N that are allocated with the use of the configuration TLP, the memory spaces that the VFs 602-1 to 602-N request (Step D4); and allocates, on the basis of the obtained information, the ID numbers and memory spaces of the root domains 104-1 to 104-N to the VFs 602-1 to 602-N by setting in the virtual CFG REGs 503-1 to 503-N (Step D5). Moreover, the values registered in the virtual CFG REGs 503-1 to 503-N are automatically reflected in the address swap table 506 (Step D6). Thanks to the procedures as described above with reference to FIGS. 8 and 9, the entry into the address swap table 506 is complete, and the computers 1-1 to 1-N can use the allocated VFs 602-1 to 602-N in the same manner as the computers 1-1 to 1-N use the functions of the conventional I/O device.

The following describes the effect of the first exemplary embodiment of the present invention.

According to the first exemplary embodiment of the present invention, the I/O domain that is an address space unique to the I/O device is created, and the ID number space and the memory space are allocated. Subsequently, for the ID number spaces and memory spaces of the root domains of a plurality of computers, the ID number space and memory space of the I/O domain are mapped with the VFs that the I/O device has as units. Then, the VFs that the single I/O device is equipped with are separately allocated to a plurality of computers, allowing the I/O device to be shared between the computers.

Second Exemplary Embodiment

The following describes in detail a second exemplary embodiment of the present invention with reference to the accompanying drawings.

Figure 10:
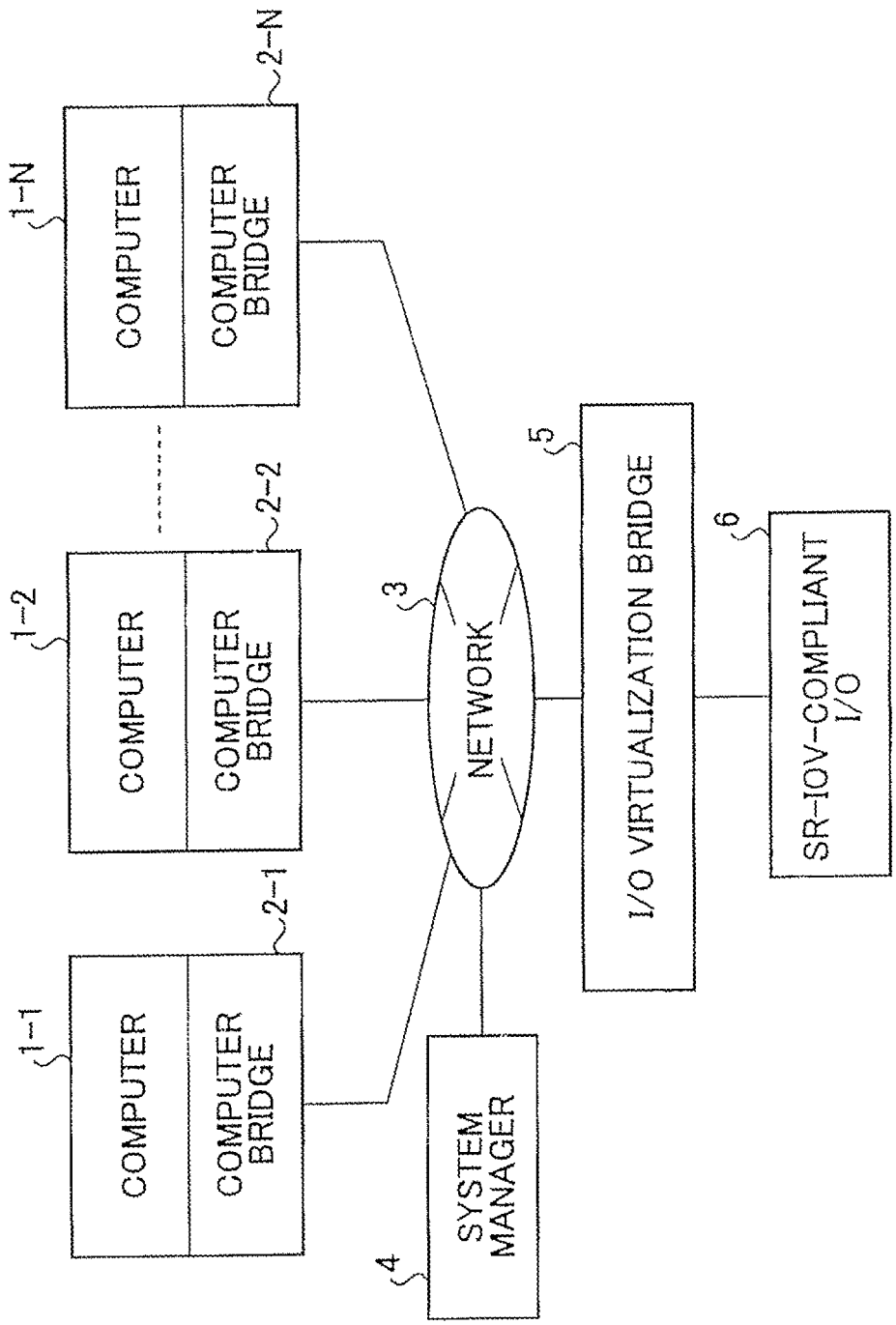
FIG. 10 A block diagram illustrating the overall configuration of a second exemplary embodiment of the present invention.
Figure 11:
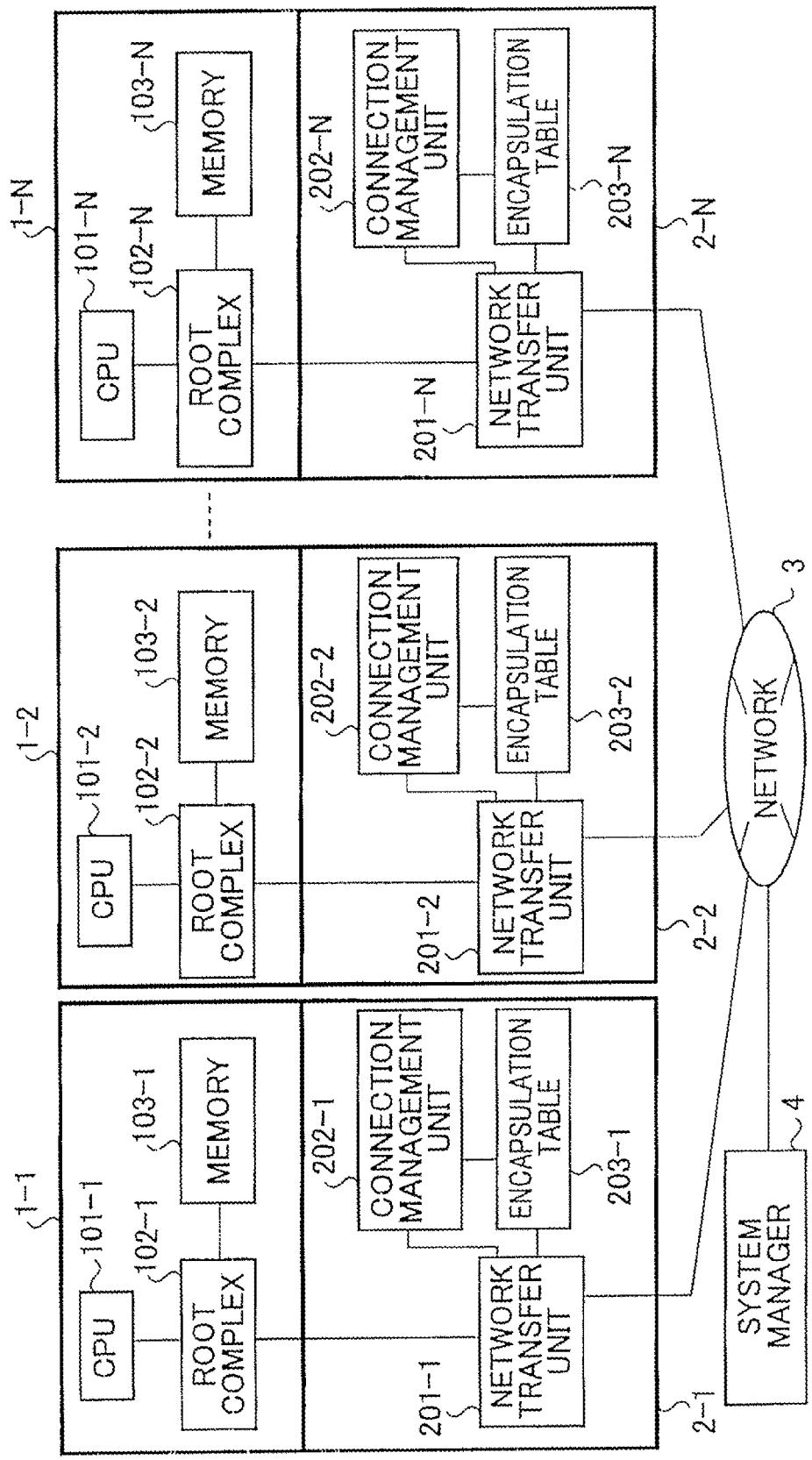
FIG. 11 A block diagram illustrating part of the configuration of the second exemplary embodiment of the present invention.
Figure 12:
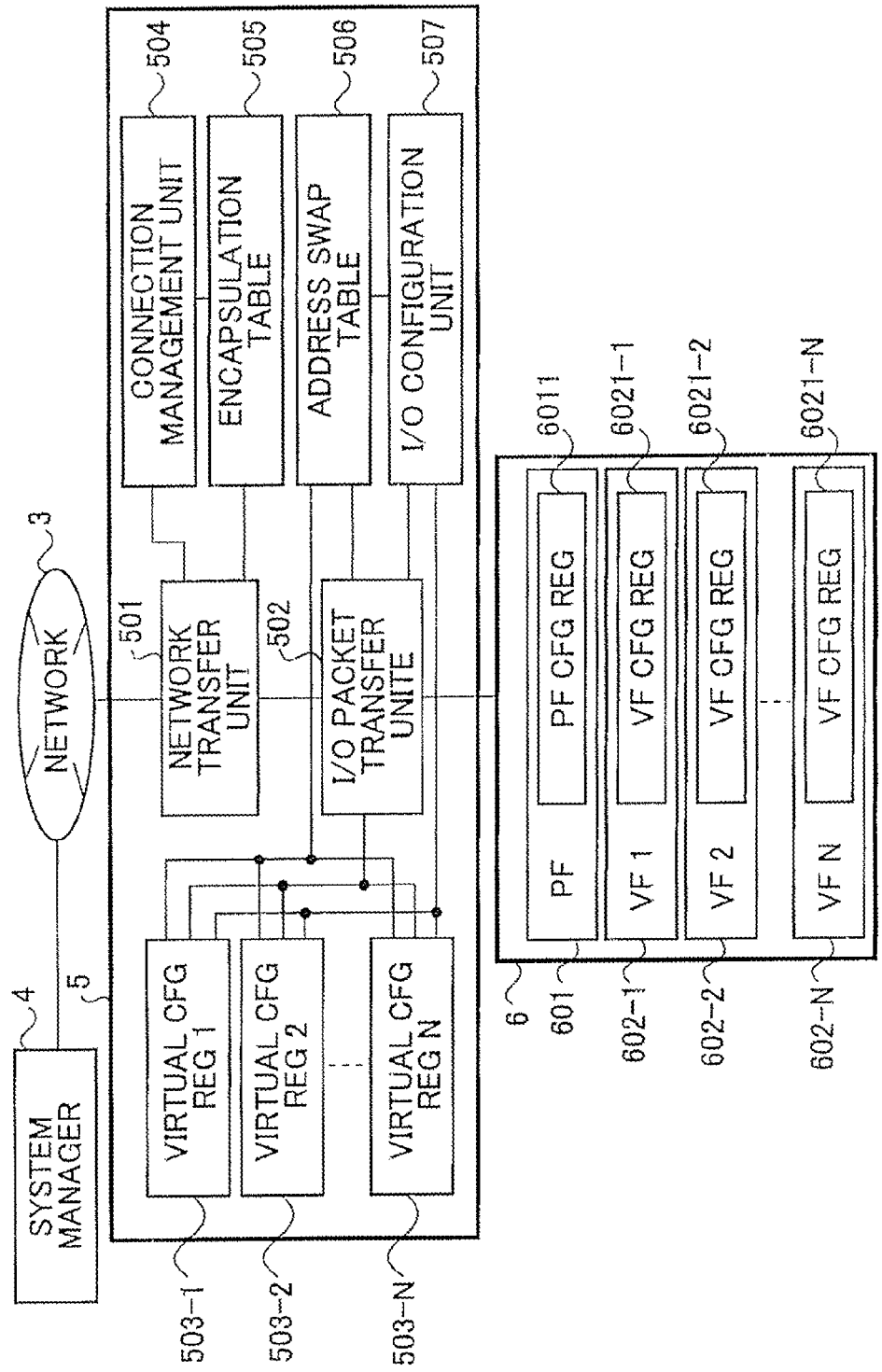
FIG. 12 A block diagram illustrating the other part of the configuration of the second exemplary embodiment of the present invention.
Figure 13:
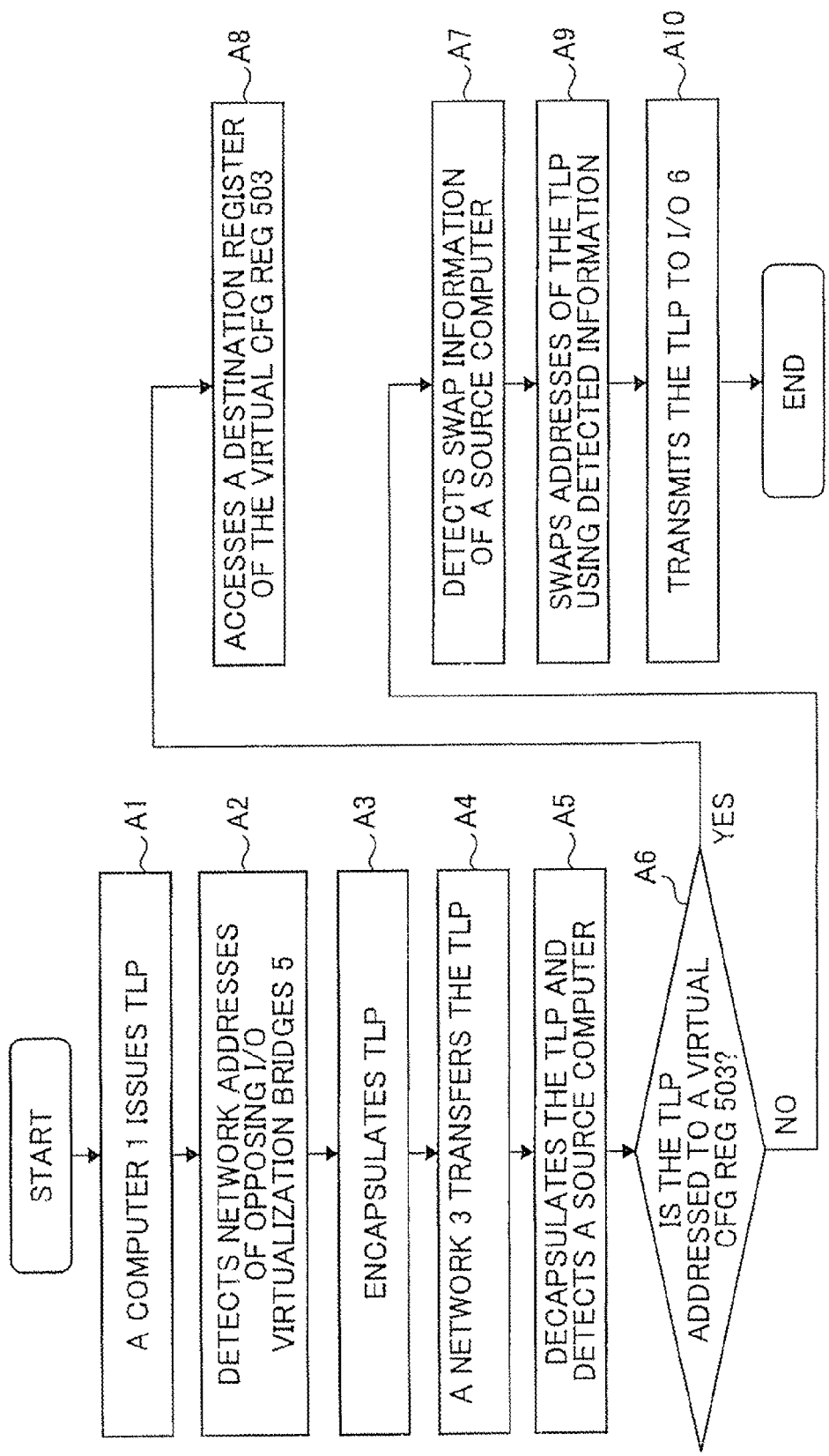
FIG. 13 A flowchart illustrating the operation of the second exemplary embodiment of the present invention.

FIG. 10 is a block diagram illustrating the overall configuration of the second exemplary embodiment of the present invention. FIG. 11 is a block diagram illustrating part of the configuration of the second exemplary embodiment of the present invention. FIG. 12 is a block diagram illustrating the other part of the configuration of the second exemplary embodiment of the present invention. FIG. 11 shows the details of computers and computer bridges. FIG. 12 shows the details of an I/O virtualization bridge and an SR-IVO-compliant I/O device.

According to the present exemplary embodiment, between a plurality of computers and the I/O device that are connected to each other through a network, tunneling is realized by the computers that encapsulate and decapsulate packets (I/O packets) that are used for accessing the I/O device. The combination of the computers and the I/O device to be connected through tunneling is changed by setting. On the address information of the I/O packets, the address spaces of the computers and the address spaces of the I/O device are swapped. For a plurality of the computers, the memory spaces and interrupt resources of the I/O device are separately allocated.

As shown in FIGS. 10 to 12, in addition to the components in the first exemplary embodiment illustrated in FIG. 3, the system of the present exemplary embodiment includes a network 3, which connects a plurality of computers 1-1 to 1-N and the I/O device 6; computer bridges 2-1 to 2-N, which offer bridges between the computers 1-1 to 1-N and the network 3; and a system manager 4, which controls the allocation of the I/O device 6 to the computers 1-1 to 1-N. Moreover, according to the present exemplary embodiment, the I/O virtualization module 7 of the first exemplary embodiment is replaced by an I/O virtualization bridge 5 that provides a bridge between the network 3 and the I/O device 6.

The computer bridges 2-1 to 2-N include network transfer units 201-1 to 201-N, which receive and transmit TLPs after encapsulating the TLPs in packets that are designated for the network 3, connection management units 202-1 to 202-N, which communicate with the system manager 4 and control connection with the I/O virtualization bridge 5; and encapsulation tables 203-1 to 203-N, which retain network addresses of opposing nodes of connection.

The encapsulation tables 203-1 to 203-N associate, with the ID numbers and memory spaces of the VFs 602-1 to 602-N allocated to the computers 1-1 to 1-N, the network address of the I/O virtualization bridge 5 to be connected to the I/O device 6 to which the VFs 602-1 to 602-N belong.

The network transfer units 201-1 to 201-N receive the TLPs addressed to the I/O device 6 from the computers 1-1 to 1-N; use the destination information indicated by the memory spaces and ID numbers recorded in the headers of the TLPs to detect, from the encapsulation tables 203-1 to 203-N, the network address of the I/O virtualization bridge 5 to which the I/O device 6 is to be connected; and transmit the TLPs to the network 3 after encapsulating the TLPs using the obtained network address. On the other hand, the network transfer units 201-1 to 201-N receive the packets of the encapsulated TLPs addressed to the computers 1-1 to 1-N from the network 3, and transmit the TLPs to the computers 1-1 to 1-N after decapsulating the TLPs.

The connection management units 202-1 to 202-N communicate with the system manager 4 using dedicated control packets; register the new connections between the computer bridges 2-1 to 2-N and the I/O virtualization bridge 5 in the encapsulation tables 203-1 to 203-N; and delete the broken connections from the encapsulation tables 203-1 to 203-N.

In addition to the components of the I/O virtualization module 7 of the first exemplary embodiment illustrated in FIG. 3, the I/O virtualization bridge 5 is equipped with a network transfer unit 501, which transmits and receives the packets of the encapsulated TLPs to or from the network 3; a connection management unit 504, which communicates with the system manager 4 and controls connection with the computer bridges 2-1 to 2-N; and a encapsulation table 505, which retains network addresses of opposing nodes of connection. The I/O virtualization bridge 5 also includes an I/O packet transfer unit 502, which has replaced the I/O packet transfer unit 701.

The encapsulation table 505 associates, with identifiers of the computers 1-1 to 1-N, the network addresses of the computer bridges 2-1 to 2-N to which the computers 1-1 to 1-N are to be connected.

The network transfer unit 501 receives, from the I/O packet transfer unit 502, the TLPs addressed to the computers 1-1 to 1-N and the identifiers of the computers 1-1 to 1-N to which the TLPs are addressed; uses the received identifiers to detect, from the encapsulation table 505, one of the network addresses of the computer network bridges 2-1 to 2-N to which the computers 1-1 to 1-N are to be connected; and transmits the TLPs to the network 3 after encapsulating the TLPs using the obtained network address. On the other hand, the network transfer unit 501 receives the packets of the encapsulated TLPs addressed to the I/O device 6 from the network 3; decapsulates the TLPs; identifies, at the time of decapsulation, the computer that has transmitted the packets; and transfers to the I/O packet transfer unit 502 the received TLPs and the identifier of the computer which is the source of the TLPs.

The connection management units 504 communicates with the system manager 4 using dedicated control packets; registers the new connections between the computer bridges 2-1 to 2-N and the I/O virtualization bridge 5 in the encapsulation table 505; and deletes the broken connections from the encapsulation table 505.

The operation of I/O packet transfer unit 502 with respect to the network transfer unit 501 is different from that of the I/O packet transfer unit 701. When receiving, from the network transfer unit 501, the TLPs that are issued by the computers 1-1 to 1-N and addressed to the I/O device 6, the I/O packet transfer unit 502 receives the identifier of the computer that is the source of the TLPs. Moreover, when receiving, from the network transfer unit 501, the TLPs that are issued by the computers 1-1 to 1-N and addressed to the virtual CFG REGs 503-1 to 503-N, the I/O packet transfer unit 502 receives the identifier of the computer that is the source of the TLPs. Moreover, when receiving from the I/O device 6 the TLPs addressed to the computers 1-1 to 1-N, swapping the destination/source addresses the headers of the TLPs have, and transferring the TLPs to the network transfer unit 501, the I/O packet transfer unit 502 also transfers the identifier of the computer that is the destination of the TLPs. Similarly, when receiving, from the virtual CFG REGs 503-1 to 503-N, the response TLPs of configuration access for the virtual CFG REGs 503-1 to 503-N of the computers 1-1 to 1-N and then transferring the response TLPs to the network transfer unit 501, the I/O packet transfer unit 502 transfers the identifier of the computer that is the destination of the TLPs.

The system manager 4 controls user interfaces and programs to manage the connections between the computer bridges 2-1 to 2-N and the I/O virtualization bridge 5 in the I/O system. Thus, the I/O device 6 is allocated to the computers 1-1 to 1-N. The management of connection is conducted with the connection management units 202-1 to 202-N and 504 with the use of dedicated control packet.

The following describes in detail the operation of the second exemplary embodiment of the present invention.

With reference to FIGS. 10 to 12 and 13, the operation of the computers 1-1 to 1-N issuing the TLPs to the allocated VFs 602-1 to 602-N will be described. Described here is an example of the operation in which the computer 1-1 issues the TLP to the VF 602-1 of the I/O device 6. A similar operation is performed when the computers 1-2 to 1-N issue the TLPs to the VFs 602-2 to 602-N of the I/O device 6.

As shown in FIGS. 10 to 12, the operation of the second exemplary embodiment is different from the operation of the first exemplary embodiment illustrated in FIG. 6: The operation of the second exemplary embodiment includes Steps A2 to A5, not Step E1. The network transfer unit 201-1 receives the TLP that the computer 1-1 issues; detects, from the encapsulation table 203-1, the network address of the I/O virtualization bridge 5 to which the I/O device 6 including the VF 602-1 is to be connected (Step A2); and encapsulates the TLP using the detected network address (Step A3). The encapsulated TLP is transferred by the network 3 to the I/O virtualization bridge 5 (Step A4). The network transfer unit 501 receives the packet of the encapsulated TLP, and decapsulates the TLP (Step A5). At this time, the network transfer unit 501 identifies the computer 1-1, which is the source of the TLP, from the packet to be decapsulated, and transfers the identifier of the identified computer 1-1 and the decapsulated TLP, to the I/O packet transfer unit 502.

The following describes the operation of the case in which the VFs 602-1 to 602-N issue the TLPs to the allocated computers 1-1-1 to 1-N, with reference to FIGS. 10 to 12 and 14. Described here is an example of the operation in which the VF 602-1 issues the TLP to the allocated computer 1-1. A similar operation is conducted when the VFs 602-2 to 602-N issue the TLPs to the allocated computers 1-2 to 1-N.

Figure 14:
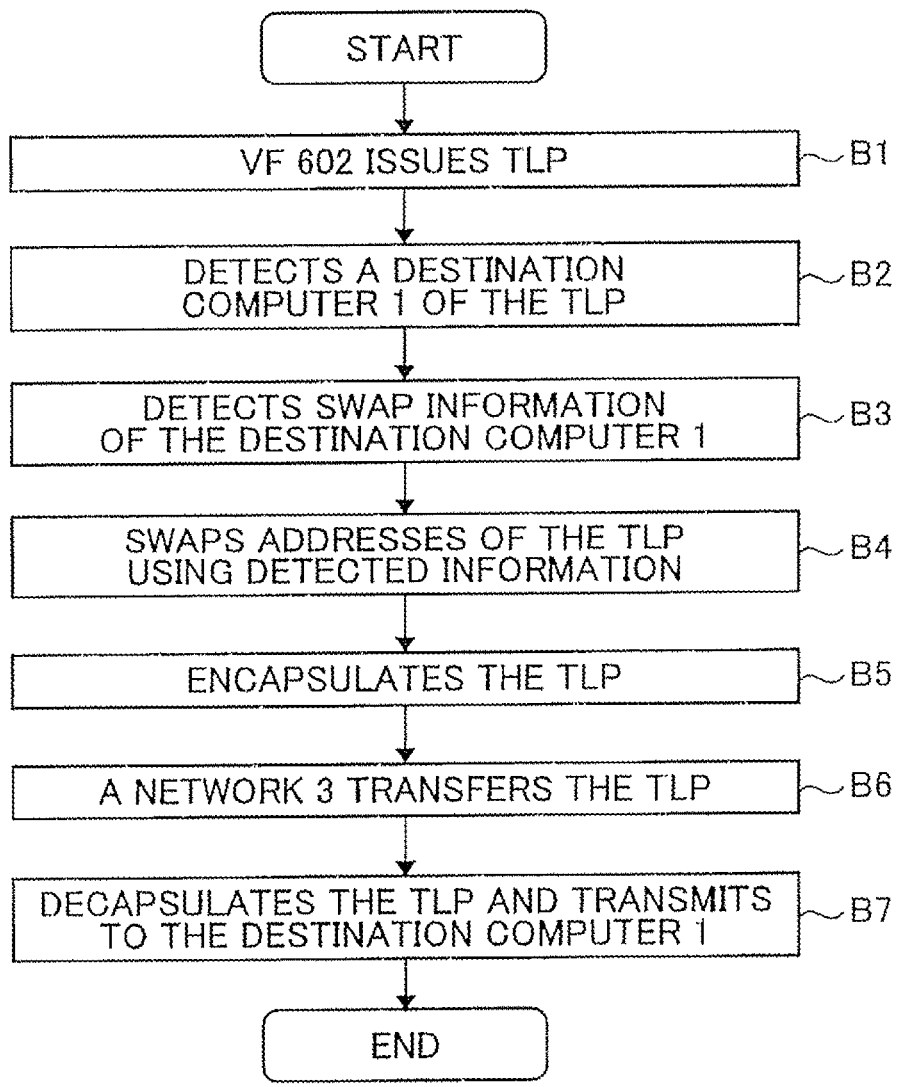
FIG. 14 A flowchart illustrating the operation of the second exemplary embodiment of the present invention.

As shown in FIG. 14, the operation of the second exemplary embodiment is different from the operation of the first exemplary embodiment illustrated in FIG. 7: The operation of the second exemplary embodiment includes Steps B5 to B7, not Step F1. The network transfer unit 501 receives the TLP and the identifier of the computer 1-1, which is the destination of the TLP, from the I/O packet transfer unit 502; uses the identifier to detect, from the encapsulation table 505, the network address of the computer bridge 2-1 that the computer 1-1 is to be connected to; and encapsulates the TLP using the obtained network address (Step B5). The network 3 transfers the packet of the encapsulated TLP to the destination computer bridge 2-1 (Step B6). The network transfer unit 201-1 receives the packet of the encapsulated TLP, and transmits the TLP to the computer 1-1 after decapsulating the TLP (Step B7).

The following describes the operation of configuration of the I/O device 6 in order to share the I/O device 6 between a plurality of the computers 1-1 to 1-N. The configuration of the I/O device 6 is conducted in two stages: the configuration of the I/O device 6 by the I/O virtualization bridge 5 before the I/O device 6 is allocated to the computers 1-1 to 1-N, and the configuration performed when the VFs 602-1 to 602-N that the I/O device 6 is equipped with are allocated to the computers 1-1 to 1-N.

The configuration of the I/O device 6 by the I/O configuration unit 507 that the I/O virtualization bridge 5 is equipped with before the I/O device 6 is allocated to the computers 1-1 to 1-N is the same as in the first exemplary embodiment and therefore not described here.

The following describes the configuration of the allocated VFs 602-1 to 602-N of the I/O device 6 by the computers 1-1 to 1-N after the configuration of the I/O device 6 is performed by the I/O virtualization bridge 5, with reference to FIGS. 10 to 12 and 15.

Figure 15:
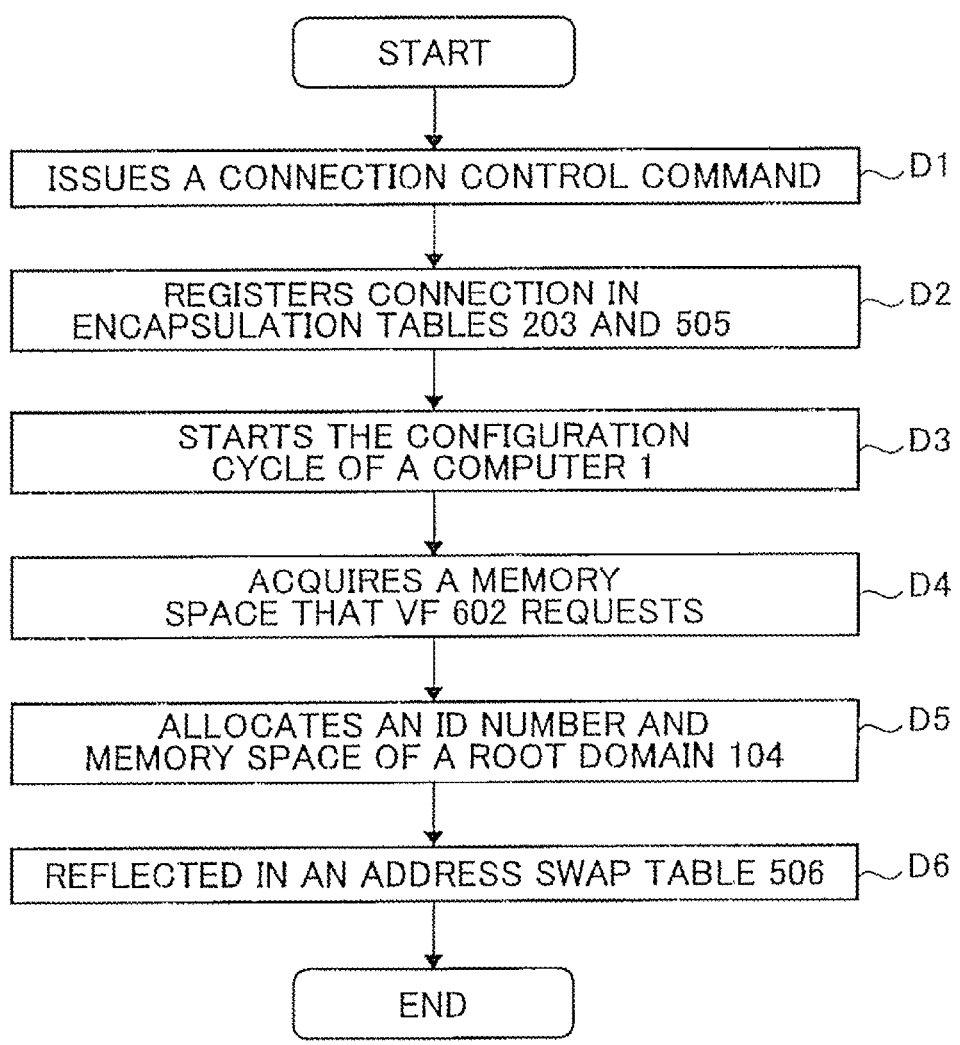
FIG. 15 A flowchart illustrating the operation of the second exemplary embodiment of the present invention.

As shown in FIG. 15, the operation of the second exemplary embodiment is different from the operation of the first exemplary embodiment illustrated in FIG. 9: The operation of the second exemplary embodiment includes Steps D1 and D2. The system manager 4 accepts from user interfaces and programs the setting of the computers 1-1 to 1-N to which the VFs 602-1 to 602-N are allocated; and issues a connection production command using control packets to the connection management units 202-1 to 202-N of the computer bridges 2-1 to 2-N to which the computers 1-1 to 1-N that the VFs 602-1 to 602-N are allocated to are to be connected and to the connection management unit 504 of the I/O virtualization bridge 5 that the I/O device 6 including the VFs 602-1 to 602-N is to be connected to (Step D1). The connection management units 202-1 to 202-N and the connection management unit 504 register the network addresses of opposing nodes whose connections the connection management units 202-1 to 202-N and the connection management unit 504 are to produce, in the encapsulation tables 203-1 to 203-N and the encapsulation table 505, respectively (Step D2). As a result of registration, the VFs 602-1 to 602-N are automatically allocated to the computers 1-1 to 1-N. The computers 1-1 to 1-N then use the VFs 602-1 to 602-N in the same way as one function of the conventional I/O device.

The following describes the effect of the second exemplary embodiment of the present invention.

According to the second exemplary embodiment of the present invention, the allocation of the VFs to the computers is freely set by the network and the system manager. Therefore, the I/O device on the network can be shared flexibly between the computers. In addition, the arrangement of the I/O device and the computers that share the I/O device can be flexibly designed with the use of the network.

Third Exemplary Embodiment

The following describes in detail a third exemplary embodiment of the present invention with reference to the accompanying drawings.

Figure 16:
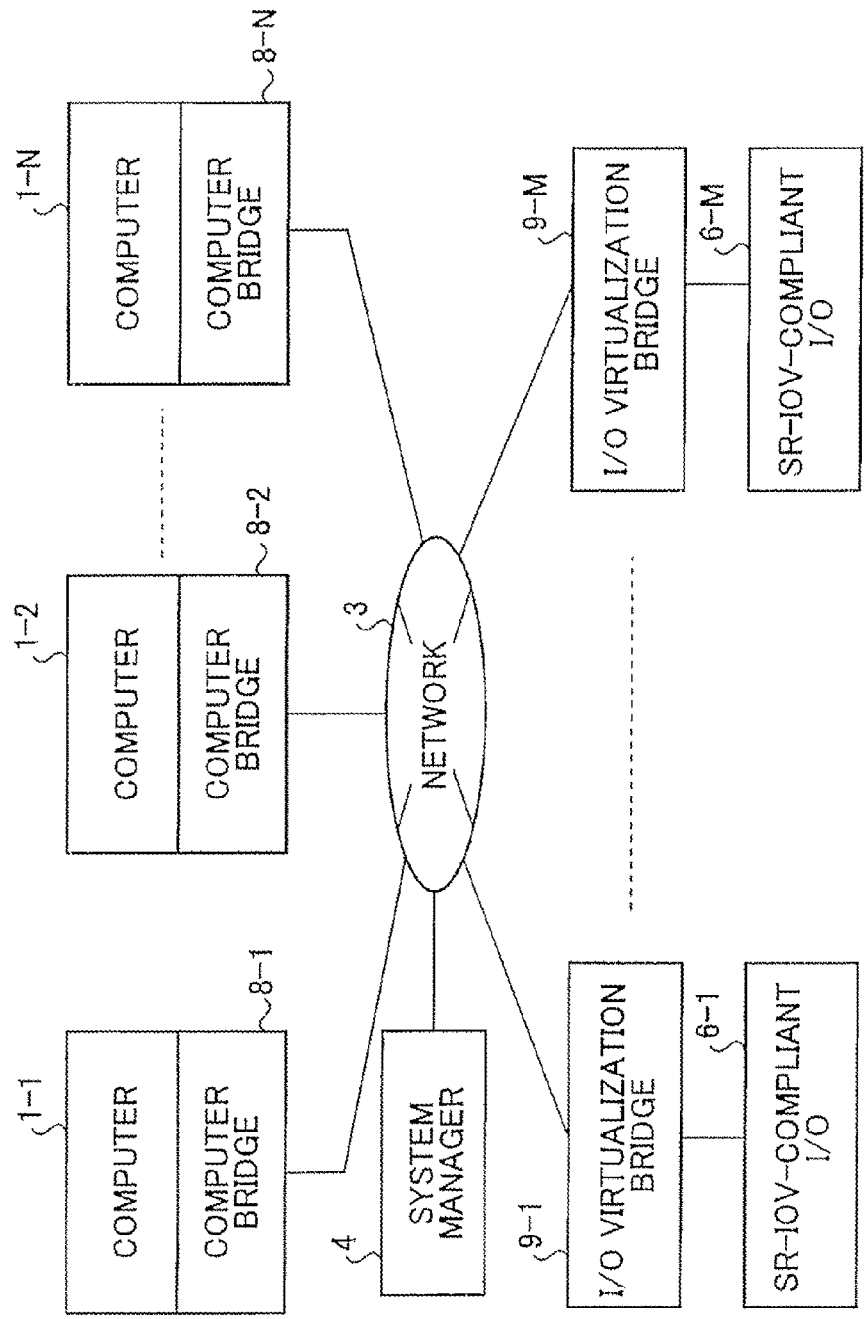
FIG. 16 A block diagram illustrating the overall configuration of a third exemplary embodiment of the present invention.
Figure 17:
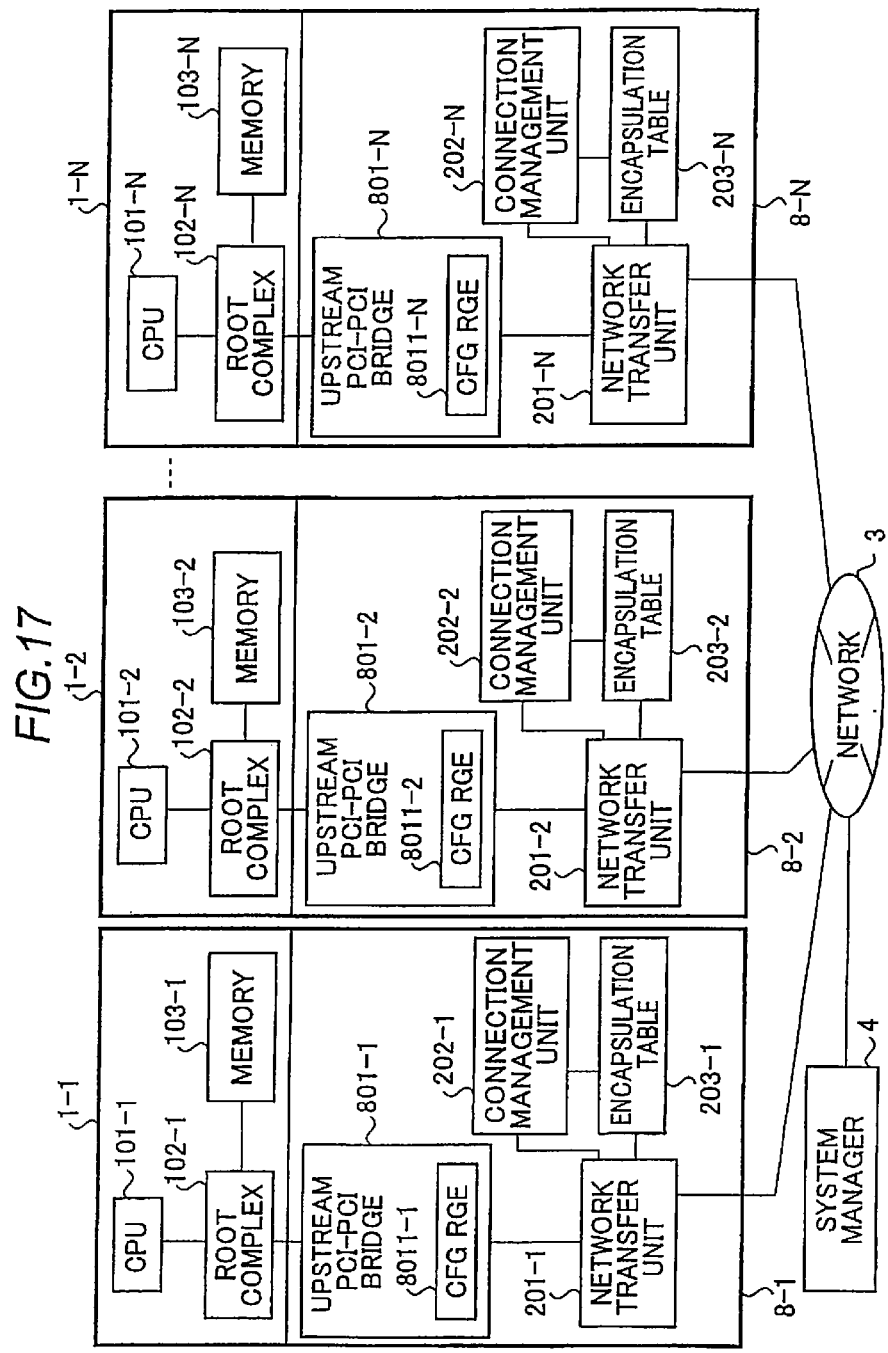
FIG. 17 A block diagram illustrating part of the configuration of the third exemplary embodiment of the present invention.
Figure 18:
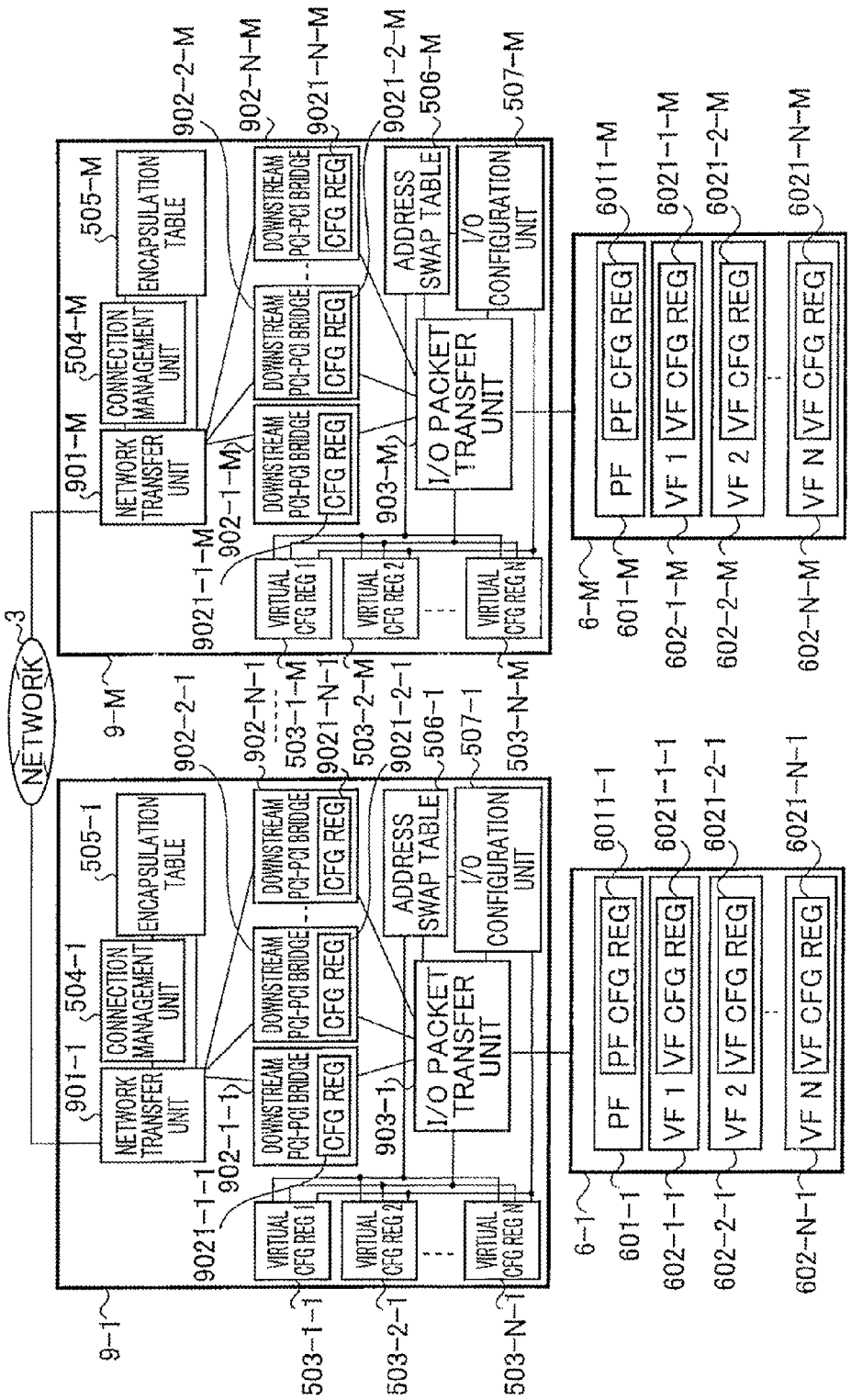
FIG. 18 A block diagram illustrating the other part of the configuration of the third exemplary embodiment of the present invention.

FIG. 16 is a block diagram illustrating the overall configuration of the third exemplary embodiment of the present invention. FIG. 17 is a block diagram illustrating part of the configuration of the third exemplary embodiment of the present invention. FIG. 18 is a block diagram illustrating the other part of the configuration of the third exemplary embodiment of the present invention. FIG. 17 shows the details of computers and computer bridges. FIG. 18 shows the details of an I/O virtualization bridge and an SR-IVO-compliant I/O device.

According to the third exemplary embodiment of the present invention, as shown in FIGS. 16 to 18, in addition to the components in the second exemplary embodiment illustrated in FIGS. 10 to 12, computer bridges 8-1 to 8-N include upstream PCI-PCI bridges 801-1 to 801-N, and I/O virtualization bridges 9-1 to 9-M include downstream PCI-PCI bridges 902-1-1 to 902-N-M. Moreover, the network transfer unit 501 and the I/O packet transfer unit 502 are replaced by network transfer units 901-1 to 901-M and I/O packet transfer units 903-1 to 903-M. In the I/O system, a plurality of I/O devices 6-1 to 6-M are shared between a plurality of computers 1-1 to 1-N on the network 3.

The computer bridges 8-1 to 8-N and the I/O bridges 9-1 to 9-M include the upstream PCI-PCI bridges 801-1 to 801-N and the downstream PCI-PCI bridges 902-1-1 to 902-N-M between the computers 1-1 to 1-N and the I/O devices 6-1 to 6-M, respectively. The software running on the computers 1-1 to 1-N recognizes that the PCI Express switch 10 illustrated in FIG. 1 is inserted between the computers 1-1 to 1-N and the I/O devices 6-1 to 6-M.

The downstream PCI-PCI bridges 902-1-1 to 902-N-M are separately allocated to the computers 1-1 to 1-N to which the VFs 602-1-1 to 602-N-1, ..., and 602-1-M to 602-N-M that the I/O devices 6-1 to 6-M are equipped with are allocated.

When transferring, to the I/O devices 6-1 to 6-M, the TLPs that the computers 1-1 to 1-N issue, the network transfer units 901-1 to 901-M transfer the TLPs to the I/O packet transfer units 903-1 to 903-M via the PCI-PCI bridges 902-1-1 to 902-N-1, ..., and 902-1-M to 902-N-M corresponding to the computers 1-1 to 1-N.

When transferring, to the computers 1-1, to 1-N the TLPs that the I/O devices 6-1 to 6-M issue, the I/O packet transfer units 903-1 to 903-M transfer the TLPs to the network transfer units 901-1 to 901-M via the PCI-PCI bridges 902-1-1 to 902-N-1, ..., and 902-1-M to 902-N-M corresponding to the computers 1-1 to 1-N.

The operation of the third exemplary embodiment of the present invention is the same as that of the second exemplary embodiment and therefore not described here.

The following describes the effect of the third exemplary embodiment of the present invention.

According to the third exemplary embodiment of the present embodiment, the software running on the computers is designed to recognize that the PCI Express switch is inserted between a plurality of I/O devices that a plurality of the computers share. Therefore, it is possible to connect a plurality of the computers and a plurality of the I/O devices to each other, allowing a plurality of the I/O devices to be simultaneously shared between a plurality of the computers. Moreover, which I/O devices are shared by which computers is flexibly set by the system manager. Furthermore, the PCIe buses are terminated near the computers and the I/O devices by the upstream PCI-PCI bridges and the downstream PCI-PCI bridges; the system is freed from the restriction of packet transfer time defined by the PCIe protocol when TLPs are transferred with the use of the network. Therefore, the commercially available root complex 102 and I/O device 6 can be applied to the I/O system to realize I/O sharing without changing the specifications of the root complex 102 and the I/O device 6.

In each of the exemplary embodiments described above, the I/O device can be shared between a plurality of computers. The reason is that since the VFs of the I/O device are sepa-rately allocated to the computers and the I/O domain is mapped on the root domains of a plurality of the computers, the computers use the I/O device in the same way as when the I/O device is exclusively allocated to the computer.

Moreover, in each of the exemplary embodiments, the I/O device can be shared between a plurality of computers without changing operating systems and system drivers. The reason is that since the VFs of the I/O device are separately allocated to the computers and the I/O domain is mapped on the root domains of a plurality of the computers, the computers use the I/O device in the same way as when the I/O device is exclusively allocated to the computer.

In the exemplary embodiments described above, the case of PCI Express has been described as a standard example. However, the present invention is not limited to PCI Express. The present invention can be applied to any possible standards that might be developed from the PCI.

In the present application, "PCI Express" refers to the standard defined by NPL1 (PCI-SIG, "PCI Express Base Specification Revision 2.0," Dec. 20, 2006, pp. 35) and standards that are extended based on the above standard.

The above has described the exemplary embodiments of the present invention. However, the present invention may be embodied in other forms without departing from the spirit and essential characteristics defined by the appended claims. The described embodiments are therefore to be considered only as illustrative, not as restrictive. The scope of the invention is indicated by the appended claims and isn't limited by the description of the specification or the abstract. Furthermore, all modifications and alterations which come within the meaning and range of equivalency of the claims are to be embraced within the scope of the present invention.

INDUSTRIAL APPLICABILITY

The present invention can be applied for sharing an I/O device between a plurality of computers or between a plurality of information processing devices that include CPU or arithmetic units that work like CPU, in the field of computer device, network device, industrial machine, and consumer electronics.

The invention claimed is:
1. An I/O system comprising:
a plurality of computers;
an I/O device configured to hold memory spaces and interrupt resources to be separately allocated to the plurality of computers, the I/O device complying with rules set by PCI Express and being equipped with virtual functions; and
an I/O virtualization device provided between the plurality of computers and the I/O device,
the I/O virtualization device forming an address space unique to the I/O device, mapping the address space of the I/O device onto address spaces of the plurality of computers, and swapping address spaces of the computers and the address space of the I/O device, for packets (I/O packets) used for access between the computers and the I/O device,
wherein the virtual functions serve as units for the resources allocated to respective computers, the number of the virtual functions is equal to the number of the computers, and the virtual functions and the computers have a one-to-one correspondence.

2. The I/O system according to claim 1, wherein
the I/O virtualization device comprises:
- a swap unit that swaps addresses of the I/O packets between the address space of the I/O device and the address spaces of the plurality of computers;
- a holding unit that holds swap information about relations between the address space of the I/O device and the address spaces of the plurality of computers;
- an address space formation unit that forms the address space unique to the I/O device; and
- an acquisition unit that acquires spaces necessary for mapping the address space of the I/O device onto the address spaces of the computers during a configuration cycle of the computers.

3. The I/O system according to claim 1, wherein
the address space of the computer that is to be swapped is acquired by a register that complies with a standard during a configuration cycle of the computers.

4. The I/O system according to claim 2, wherein
the address space formation unit checks an address space necessary for the resources that the shared I/O device allocates to each computer by simulating the configuration access of the computers before the computers that share the I/O device start a configuration cycle of the I/O device, allocates the address space unique to the I/O device to the I/O device on the basis of the checked address space, and informs the acquisition unit about the checked address space.

5. The I/O system according to claim 1, wherein
the I/O device complies with rules set by Single Root I/O Virtualization (SR-IOV) of the PCI Express.

6. An I/O system comprising:
a plurality of computers;
an I/O device configured to hold memory spaces and interrupt resources which are separately allocated to the plurality of computers, the I/O device complying with rules set by PCI Express and being equipped with virtual functions;
a network configured to transfer encapsulated packets (I/O packets) which are used for accessing the I/O device;
computer bridges configured to offer bridges between the computers and the network, and to encapsulate and decapsulate the I/O packets from the computers;
an I/O virtualization bridge configured to offer a bridge between the network and the I/O device, to encapsulate and decapsulate the I/O packets, and to swap address spaces of the computers and an address space created unique to the I/O device for address information of the I/O packets; and
a manager configured to control a connection between the computer bridges and the I/O virtualization bridge,
wherein the virtual functions serve as units for the resources allocated to respective computers, the number of the virtual functions is equal to the number of the computers, and the virtual functions and the computers have a one-to-one correspondence.

7. The I/O system according to claim 6, wherein
each of the computer bridges comprises:
a first transfer unit that detects a network address of the I/O virtualization bridge to which the I/O device that is necessary for encapsulating I/O packets is connected, and encapsulates and decapsulates the I/O packets to transfer between the computers and the network;
a first holding unit that holds the network address of the I/O virtualization bridge to which the I/O device is connected; and
a first management unit that registers in the first holding unit the network address of the I/O virtualization bridge to which the I/O device is connected, in accordance with a command from the manager, and
the I/O virtualization bridge comprises:
a second transfer unit that detects a network address of the computer bridge to which the computer is connected, the network address being necessary for encapsulating I/O packets, and encapsulates and decapsulates the I/O packets to transfer between the I/O device and the network;
a second holding unit that holds the network address of the computer bridge to which the computer is connected;
a second management unit that registers in the second holding unit the network address of the computer bridge to which the computer is connected, in accordance with a command from the manager;
a swap unit that swaps addresses of the I/O packets between the address space of the I/O device and the address spaces of the plurality of computers;
a third holding unit that holds swap information about relations between the address space of the I/O device and the address spaces of the plurality of computers;
an address space formation that forms the address space unique to the I/O device; and
an acquisition unit that acquires spaces necessary for mapping the address space of the I/O device onto the address spaces of the computers during a configuration cycle of the computers.

8. The I/O system according to claim 6, wherein
the address space of the computer that is to be swapped is acquired by a register that complies with a standard during a configuration cycle of the computers.

9. The I/O system according to claim 7, wherein
the address space formation unit checks an address space necessary for the resources that the shared I/O device allocates to each computer by simulating the configuration access of the computers before the computers that share the I/O device start a configuration cycle of the I/O device, allocates the address space unique to the I/O device to the I/O device on the basis of the checked address space, and informs the acquisition unit about the checked address space.

10. The I/O system according to claim 6, wherein
the computer bridges further comprise an upstream PCI-PCI bridge;
the I/O virtualization bridge further includes a downstream PCI-PCI bridge, and
at least one I/O device connected to the network is shared between the plurality of computers connected to the same network.

11. The I/O system according to claim 6, wherein
the I/O device complies with rules set by Single Root I/O Virtualization of the PCI Express.

12. An I/O control method of an I/O system that includes a plurality of computers and an I/O device provided for the plurality of computers, comprising:
forming an address space unique to an I/O device, the I/O device complying with rules set by PCI Express and being equipped with virtual functions;
mapping the address space of the I/O device onto address spaces of a plurality of computers to share the I/O device between the plurality of computers,
swapping address spaces of the computers and an address space of the I/O device, for packets (I/O packets) used for access between the computers and the I/O device; and allocating separately memory spaces of the I/O device and interrupt resources to the plurality of computers, wherein the virtual functions serve as units for the resources allocated to respective computers, the number of the virtual functions is equal to the number of the computers, and the virtual functions and the computers have a one-to-one correspondence.

13. The I/O control method according to claim 12, wherein the address space of the computer that is to be swapped is acquired by a register that complies with a standard during a configuration cycle of the computers.

14. The I/O control method according to claim 12, wherein the address space that is created unique to the I/O device is formed by checking an address space necessary for the resources that the shared I/O device allocates to each computer by simulating the configuration access of the computers before the computers that share the I/O device start a configuration cycle of the I/O device, and by allocating the address space unique to the I/O device to the I/O device on the basis of the checked address space.

15. The I/O control method according to claim 12, wherein the I/O device complies with rules set by Single Root I/O Virtualization of the PCI Express.

16. The I/O control method according to claim 12, further comprising:

tunneling between the plurality of computers and the I/O device which are connected through a network, by encapsulating and decapsulating packets (I/O packets) that the computers use to access the I/O device; and changing, through setting, a combination of the plurality of computers and the I/O device that are connected by the tunneling.

17. The I/O control method according to claim 16, wherein the tunneling through the network between the computers and the I/O device adopts a configuration in which for software on the computers, one stage of a PCI Express switch is inserted between the computers and the I/O device, and at least one I/O device connected to the network is shared between the plurality of computers connected to the network.

18. An I/O system comprising:

a plurality of computers;

an I/O device configured to hold memory spaces and interrupt resources to be separately allocated to the plurality of computers, the I/O device complying with rules set by Single Root I/O Virtualization (SR-IOV) and being equipped with virtual functions; and an I/O virtualization device provided between the plurality of computers and the I/O device, the I/O virtualization device forming an address space unique to the I/O device, mapping the address space of the I/O device onto address spaces of the plurality of computers, and swapping address spaces of the computers and the address space of the I/O device, for packets (I/O packets) used for access between the computers and the I/O device, wherein the virtual functions serve as units for the resources allocated to respective computers, the number of the virtual functions is equal to the number of the computers, and the virtual functions and the computers have a one-to-one correspondence.

* * * * *